(12) United States Patent
Ensign, Jr. et al.

(10) Patent No.: US 7,104,304 B2
(45) Date of Patent: Sep. 12, 2006

(54) ADHESIVE TRANSFER APPARATUS WITH TAKE-UP ROLL AND A REMOVABLE CARTRIDGE FOR A MASTER PROCESSING APPARATUS

(75) Inventors: Thomas C. Ensign, Jr., Scottsdale, AZ (US); Joseph P. E. Velasquez, Gilbert, AZ (US); Jerry L. Hardy, Scottsdale, AZ (US)

(73) Assignee: Xyron, Inc., Scottsdale, AZ (US)

( * ) Notice: Subject to any disclaimer, the term of this patent is extended or adjusted under 35 U.S.C. 154(b) by 291 days.

(21) Appl. No.: 10/139,397

(22) Filed: May 7, 2002

(65) Prior Publication Data

US 2002/0124970 A1 Sep. 12, 2002

Related U.S. Application Data

(62) Division of application No. 09/564,587, filed on May 5, 2000, now Pat. No. 6,422,281.

(60) Provisional application No. 60/132,680, filed on May 5, 1999, provisional application No. 60/160,631, filed on Oct. 20, 1999.

(51) Int. Cl.
 *B32B 37/00* (2006.01)
(52) U.S. Cl. .................... 156/555; 156/579; 156/582
(58) Field of Classification Search ................ 156/495, 156/522, 555, 539, 540, 543, 552, 556, 584, 156/580, 579, 582, 583.1; 100/176; 242/156, 242/419.9
See application file for complete search history.

(56) References Cited

U.S. PATENT DOCUMENTS

| | | | |
|---|---|---|---|
| 2,191,704 A | 2/1940 | Bennett | |
| 3,043,365 A | 7/1962 | Gustafson | |
| 3,309,983 A | 3/1967 | Dresser | |
| 3,343,978 A | 9/1967 | Engelbach | |
| 3,737,359 A | 6/1973 | Levitan | |
| 3,944,455 A | 3/1976 | French | |
| 3,962,021 A | 6/1976 | Weisfeld | |
| 4,001,073 A | 1/1977 | Jones et al. | |
| 4,015,692 A | 4/1977 | Mathews | |
| 4,068,028 A | 1/1978 | Samonides | |
| 4,094,719 A | 6/1978 | Jones et al. | |
| 4,177,101 A | 12/1979 | Evans | |
| 4,405,401 A * | 9/1983 | Stahl | 156/248 |
| 4,531,690 A | 7/1985 | Condy | |
| 4,758,303 A | 7/1988 | Shastko | |
| 4,841,712 A * | 6/1989 | Roou | 53/412 |
| 4,863,543 A | 9/1989 | Shiozawa et al. | |
| 4,891,090 A | 1/1990 | Lorincz et al. | |
| 4,891,677 A | 1/1990 | Shiozawa et al. | |
| 4,966,639 A | 10/1990 | Pfeffer et al. | |
| 5,193,919 A * | 3/1993 | Godo et al. | 400/120.16 |
| 5,288,714 A | 2/1994 | Marschke | |
| 5,295,753 A | 3/1994 | Godo et al. | |

(Continued)

FOREIGN PATENT DOCUMENTS

EP 0 275 670 7/1988

*Primary Examiner*—James Sells
(74) *Attorney, Agent, or Firm*—Pillsbury Winthrop Shaw Pittman, LLP

(57) ABSTRACT

The present application discloses a master processing apparatus. One aspect of the application relates to the use of a take-up roll in the apparatus. Another aspect of the application relates to the use of a take-up roll in a cartridge mountable to the apparatus. Yet another aspect of the application relates to a cover for the apparatus. Still another aspect of the invention relates to a cartridge including a pressure applying assembly mounted therein.

55 Claims, 18 Drawing Sheets

U.S. PATENT DOCUMENTS

| | | |
|---|---|---|
| 5,316,613 A | 5/1994 | Samuelson et al. |
| 5,380,395 A | 1/1995 | Uchida |
| 5,397,427 A | 3/1995 | Traise et al. |
| 5,470,418 A | 11/1995 | Instance |
| 5,470,428 A | 11/1995 | Sanko |
| 5,472,554 A | 12/1995 | Ko et al. |
| 5,484,499 A | 1/1996 | Marschke |
| 5,580,417 A | 12/1996 | Bradshaw |
| 5,584,962 A | 12/1996 | Bradshaw et al. |
| 5,639,332 A | 6/1997 | Instance |
| 5,679,203 A | 10/1997 | Sakai |
| 5,735,998 A | 4/1998 | Bradshaw |
| 5,788,796 A | 8/1998 | Look et al. |
| 5,788,806 A | 8/1998 | Bradshaw et al. |
| 5,792,263 A * | 8/1998 | Koyama et al. ............ 118/257 |
| 5,795,435 A | 8/1998 | Waters, Jr. |
| 5,846,005 A | 12/1998 | Britz et al. |
| 5,902,440 A | 5/1999 | Jenkins |
| 6,061,076 A * | 5/2000 | Ishii et al. ................... 347/197 |
| 6,080,242 A * | 6/2000 | Gajewski ..................... 134/15 |
| 6,200,392 B1 * | 3/2001 | Korbonski .................. 134/9 |
| 6,315,020 B1 * | 11/2001 | Seki ........................... 156/351 |
| 6,422,281 B1 * | 7/2002 | Ensign et al. ............... 156/495 |

\* cited by examiner

ADHESIVE TRANSFER APPARATUS WITH TAKE-UP ROLL AND A REMOVABLE CARTRIDGE FOR A MASTER PROCESSING APPARATUS

The present application is a division of U.S. application Ser. No. 09/564,587, filed May 5, 2000, now U.S. Pat. No. 6,422,281 which claims priority to U.S. Provisional Application of Ensign, Jr., Application No. 60/132,680, filed May 5, 1999, the entirety of which is hereby incorporated into the present application by reference. The present application also claims priority to U.S. Application of Velasquez, Application No. 60/160,631, filed Oct. 20, 1999, the entirety of which is hereby incorporated into the present application by reference.

FIELD OF THE INVENTION

The present invention relates generally to master processing apparatuses.

BACKGROUND AND SUMMARY OF THE INVENTION

U.S. Pat. Nos. 5,584,962 and 5,580,417 each disclose a laminating and adhesive transfer apparatus. The '417 patent discloses a removable cartridge having a pair of rolls mounted therein and that is configured to be removably mounted to the apparatus frame. The '962 patent discloses an apparatus which is configured to be used with a pair of removable feed rolls. In contrast to being mounted in a removable cartridge, the feed rolls of the '962 patent are individually removably mounted to the apparatus frame. Each of these devices can be used to either laminate a selected substrate or to apply an adhesive to the selected substrate.

To perform an adhesive transfer operation with either device taught in the above patents, both a feed roll having an adhesive transfer substrate coated with an adhesive layer and a feed roll having an adhesive mask substrate are removably mounted to the frame either individually or together in a cartridge. The substrates are unwound and fed through a set of nip rollers. A selected substrate is fed between the transfer and mask substrates and a crank handle is manually operated to rotate the nip rollers. The rotating nip rollers cooperate to apply pressure to the substrates and discharge the substrates outwardly therefrom. The applied pressure causes the adhesive layer to bond to both the selected substrate and the portions of the mask extending around the selected substrate.

The discharged substrates can then be severed and the mask substrate can be peeled away from the transfer and selected substrates. As the mask substrate is being peeled away, the portions of the adhesive layer surrounding the selected substrate remain bonded to the mask substrate and are stripped away from the transfer substrate. The resulting article consists of the selected substrate, the transfer substrate, and the portion of the adhesive layer bonded to the selected substrate. The mask substrate can then be discarded and the selected substrate can be peeled off the transfer substrate for adherence to a desired contact surface. The advantage of the process performed by the apparatuses of the '962 and '417 patents is that it reduces the chances of excess adhesive getting on an operator's hands or other undesired surfaces because all the excess adhesive not bonded to the selected substrate is bonded to the mask substrate and discarded therewith.

Manually peeling back the mask substrate, however, does not entirely eliminate the chances of getting the adhesive on the user's hands or other surfaces due to the fact that the user still must manually handle the mask substrate. Also, the mask substrate may be dropped or otherwise mishandled to cause the adhesive thereon to get on undesired surfaces. Thus, there exists a need for an adhesive transfer device, which can effectively transfer adhesive to a selected substrate and substantially eliminate all chances of sticking extra adhesive to undesired surfaces.

To meet this need, the present invention provides an adhesive transfer apparatus for applying adhesive to a selected substrate. The apparatus comprises a frame, a first feed roll carrying a supply of an adhesive transfer substrate, and a second feed roll carrying a supply of an adhesive mask substrate. The adhesive transfer substrate has a layer of pressure-sensitive adhesive disposed on an adhesive carrying side thereof. The adhesive mask substrate has a bonding side to which the pressure-sensitive adhesive will bond. The first and second feed rolls are rotatably mounted to the frame and are positioned such that the selected substrate can be inserted between the transfer substrate and the mask substrate. In the illustrated embodiment, the feed rolls are removably mounted either directly or indirectly to the frame for replacement when desired, but may be fixedly mounted to the frame as part of a discardable low cost apparatus. Preferably, the feed rolls may be mounted together in a unitary cartridge; however, it is contemplated that the feed rolls may be removably mounted to the frame individually as in the aforementioned '962 patent, the entirety of which is hereby incorporated into the present application by reference.

A take-up roll is rotatably mounted to the frame. The adhesive mask substrate has a lead end portion thereof connected to the take-up roll. The manufacturer may take the appropriate steps to connect the mask substrate to the take-up roll or the end user can unwind the mask substrate and connect the lead end thereof to the take-up roll. As with the feed rolls, it is preferred that the take-up roll be mounted in a unitary cartridge along with the feed rolls; however, it is contemplated that the take-up roll may also be individually mounted to the frame or may be fixed in the frame as part of a low cost discardable apparatus.

A pressure applying assembly is constructed and arranged to apply pressure to the transfer substrate and the mask substrate with the selected substrate inserted therebetween. The pressure applying assembly may have a pair of cooperating pressure applying structures. These pressure applying cooperating structure may be provided by only one nip roller and a fixed opposing structure with which the nip roller cooperates; a pair of cooperating rotatable nip rollers; or a pair of non-rotatable structures disposed adjacent to one another. Examples of such non-rotatable structures may include resiliently flexible wipers that engage the opposing sides of the substrates fed therebetween to apply pressure thereto or rigid fixed or spring-biased members narrowly spaced apart to apply pressure to substrates having more than a minimum thickness fed therebetween. Further, it is possible that the entire pressure applying assembly or portions thereof may be indirectly removably mounted to the frame by a unitary cartridge along with the feed rolls and the take-up roll. This arrangement is advantageous because the substrates on the feed rolls can be pre-loaded into their operating positions by the manufacturer, thus obviating the need for the end user to attempt loading the substrates. However, it is within the scope of the present invention to have the pressure applying assembly be directly mounted to the frame instead of being mounted within a removable cartridge for removable mounting to the frame. Additionally, the adhesive may be coated on the radially outer surfaces of the transfer substrate and the pressure applying assembly may be provided by one or more springs that press the feed rolls directly together in a nip roller so that they function as nip rollers to apply pressure to the selected substrate and affect the adhesive transfer.

The apparatus is constructed and arranged such that, when the selected substrate is inserted between the adhesive transfer substrate and the adhesive mask substrate, an adhesive transfer operation can be performed wherein (a) the transfer substrate, the mask substrate, and the selected substrate are moved together in a feeding direction (b) the pressure applying assembly applies pressure to the transfer substrate and the mask substrate with the selected substrate inserted therebetween to cause the adhesive on the adhesive carrying side of the adhesive transfer substrate to adhesively bond to one side of the selected substrate and to any portions of the bonding side of the mask substrate which extend adjacent the periphery of the selected substrate and are engaged directly with the adhesive layer, and (c) the take-up roll rotates to wind up a discharged portion of the mask substrate to which the pressure has been applied along with any portions of the adhesive layer bonded to the bonding side of the discharged portion remaining bonded thereto and being substantially removed from the adhesive carrying side of the transfer substrate.

It can be thus appreciated that the apparatus of the present invention offers an easy and clean method for transferring an adhesive to a selected substrate. The apparatus of the present invention is advantageous over the apparatuses described above in that the user does not have to manually handle the adhesive mask substrate after the transfer operation has been performed. The mask substrate is simply wound up on the take-up roll, thus obviating any opportunities for the mask substrate to be mishandled or otherwise adhered or stuck to undesired contact surfaces.

Preferably, the feed rolls, the take-up roll, and the nip roller assembly are all mounted together in a unitary cartridge. This arrangement is preferred because it allows the manufacturer to load the transfer and mask substrates into their operating positions before distributing the cartridge to the end user. One of the problems with the known adhesive transfer apparatuses described above is that the end user must align the substrates together and insert them between the nip rollers properly before commencing the adhesive transfer operation. Because the substrates can be preloaded in the apparatus of the present invention, this step is obviated and the end user simply has to insert the cartridge into the machine without any additional intervening steps before commencing the adhesive transfer operation. However, it is to be understood that the principles of the present invention are not limited to such a unitary cartridge and may be broadly applied to any conceivable arrangement irrespective of whether a cartridge is used. Specifically, it is contemplated that the pressure applying assembly may be permanently mounted within the frame and the take-up rolls and feed rolls may be individually removably mounted to the frame. Further, it is contemplated that the two feed rolls may be mounted in a unitary cartridge and the take-up roll may be individually mounted separate from the cartridge. Also, the rolls may be permanently mounted to the frame so that the entire apparatus is discarded when the supplies are spent.

Another aspect of the present invention relates to a removable cartridge for use in a generic master processing apparatus. Specifically, this aspect of the invention relates to mounting the pressure applying assembly within the cartridge itself rather than mounting it within the frame as in known apparatuses such as those disclosed in the '417 and '962 patents. In accordance with the principles of the present invention, this aspect of the invention provides a removable cartridge configured to be used with master processing apparatus for processing a selected substrate. The apparatus comprises a frame and an actuator. The cartridge comprises a cartridge body structure constructed and arranged to be removably mounted to the apparatus frame, a first feed roll rotatably mounted to the body structure and carrying a supply of a first supply substrate, and a second feed roll rotatably mounted to the body structure and carrying a supply of a second supply substrate. A layer of pressure-sensitive adhesive is disposed on at least one of the first and second supply substrates.

A pressure applying assembly has a pair of pressure applying cooperating structures mounted to the cartridge body structure. The pressure applying cooperating structures are constructed and arranged to apply pressure to substrates fed therebetween. The first and second supply substrates are disposed between the cooperating structures with the layer of adhesive disposed between the substrates. The first feed roll, the second feed roll, and the pressure applying assembly are constructed and arranged such that, when the cartridge body structure is removably mounted to the frame, the selected substrate can be inserted between the cooperating structures of the pressure applying assembly and between the portions of the first and second supply substrates disposed between the cooperating structures. The pressure applying assembly is constructed and arranged to be operatively connected to the actuator when the cartridge body structure is removably mounted to the frame such that, after the selected substrate has been inserted between the cooperating structures of the pressure applying assembly and between the portions of first and second supply substrates, operation of the actuator will affect cooperating structure movement so as to (a) perform an adhesive transfer process wherein the selected substrate, the first supply substrate, and the second supply substrate are fed through the pressure applying assembly to affect adhesive bonding between the selected substrate and the supply substrates and (b) discharge the processed substrates outwardly from the pressure applying assembly.

It can be appreciated that an apparatus constructed in accordance with this aspect of the present invention allows the manufacturer to pre-load the substrates to the pressure applying assembly and thus obviates the need for the end user to have to do so him or herself. This arrangement is particularly advantageous for end users who tend to interchange between different types of cartridges often. In the known adhesive transfer apparatuses, the user must unload the supply substrates from the pressure applying assembly and remove the first cartridge and then reload the supply substrates for a second cartridge each time it is desired to change cartridges. With a cartridge constructed in accordance with the principles of this aspect of the invention, the user can simply remove the old cartridge and replace the cartridge with a new cartridge, and continue interchanging therebetween quite easily because there is no need to unload and reload the transfer substrates into and out of a single pressure applying assembly on the apparatus frame.

This aspect of the invention is not limited to adhesive transfer devices and may be practiced in laminating apparatuses, adhesive transfer devices, combinations thereof, or any other master processing apparatus.

Other objects, features, and advantages of the present invention will become apparent from the following detailed description, the accompanying drawings, and the appended claims.

DETAILED DESCRIPTION OF THE INVENTION

Figure 1:
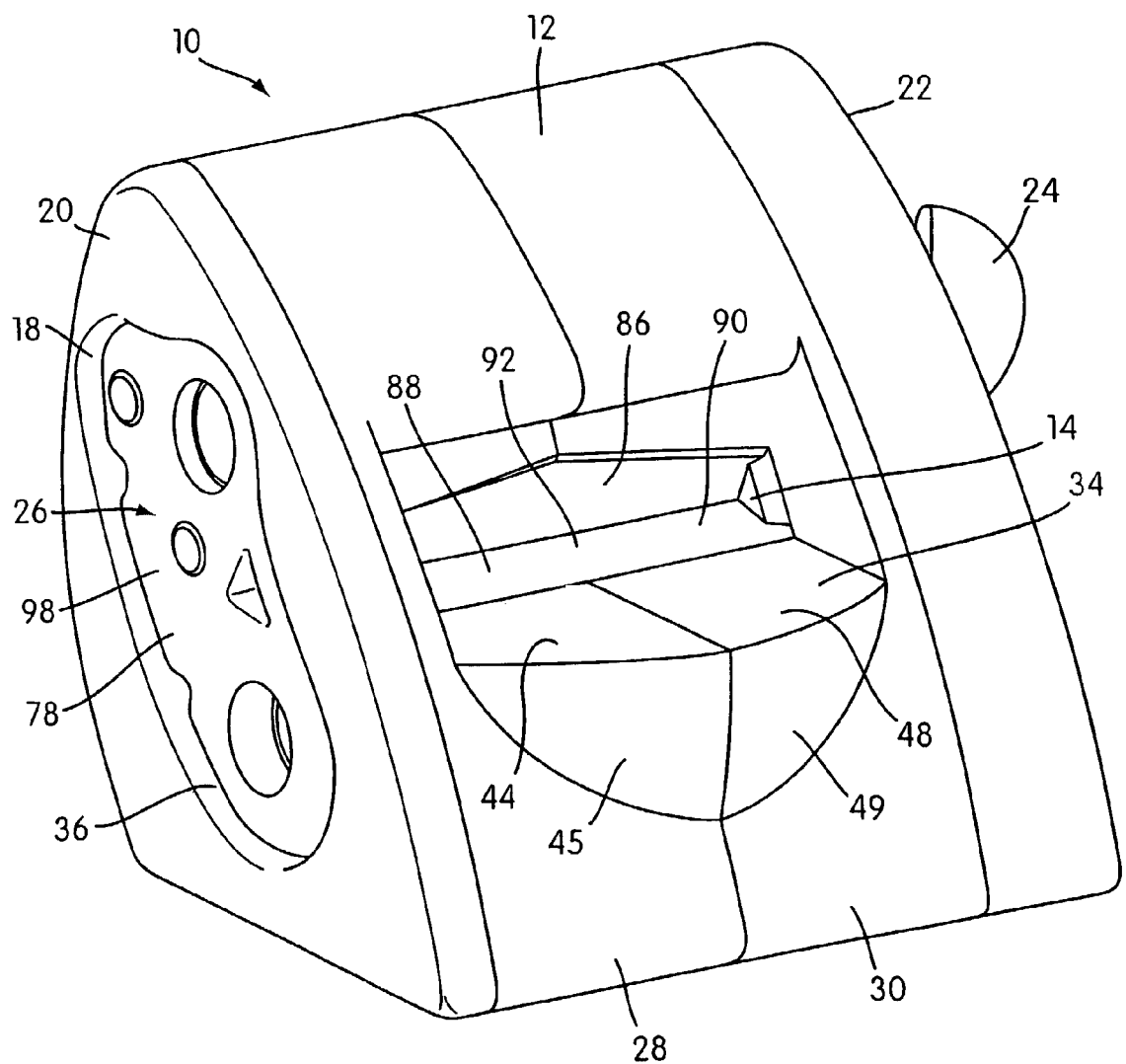
FIG. 1 is a perspective view showing an adhesive transfer apparatus constructed in accordance with the principles of the present invention, the view being taken from the front thereof.
Figure 2:
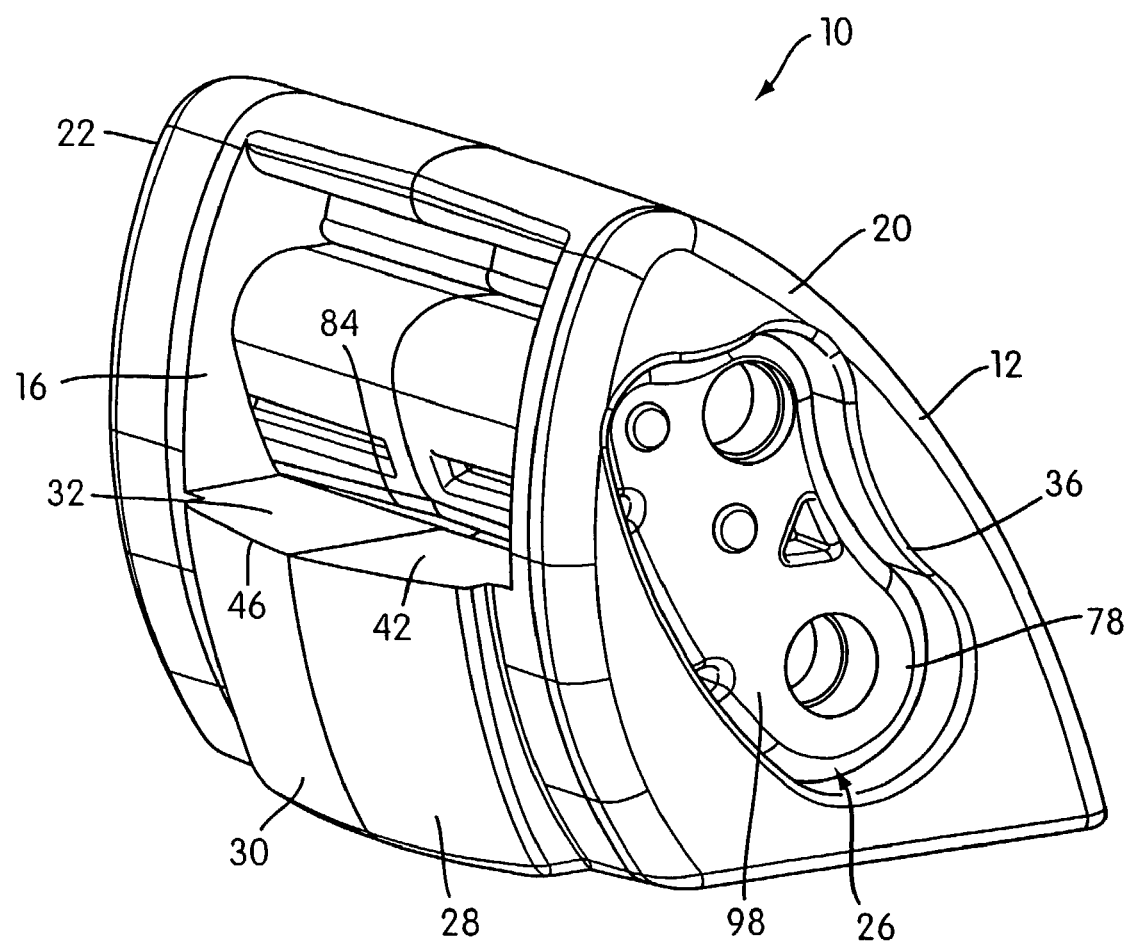
FIG. 2 is a perspective view of the apparatus of FIG. 1 taken from the rear thereof.

FIG. 1 shows an adhesive transfer apparatus, generally indicated at 10, constructed in accordance with the principles of the present invention. The apparatus 10 comprises a frame 12 having a feeding opening 14 and a discharge opening 16 facing outwardly from opposing forward and rearward sides of the frame 12, respectively. The frame 12 also has a cartridge receiving opening 18 facing laterally outwardly from one side wall 20 of the frame 12. The other side wall 22 of the frame 12 has an actuator in the form of a manual crank handle 24. A removable cartridge, generally indicated at 26, is removably mounted within the frame 12 by insertion through the cartridge receiving opening 18.

Figure 3:
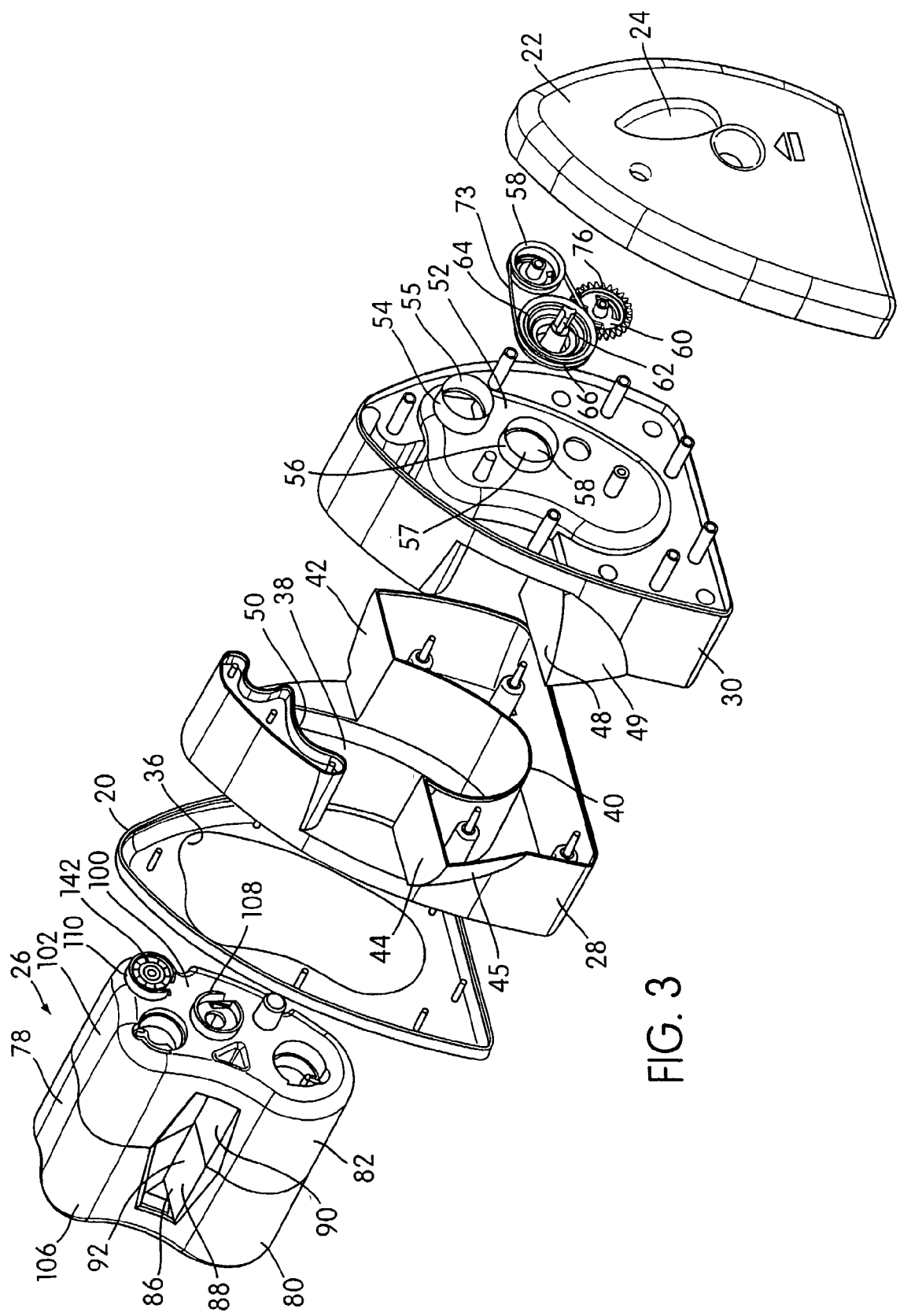
FIG. 3 is an exploded perspective view of the apparatus of FIG. 1.
Figure 4:
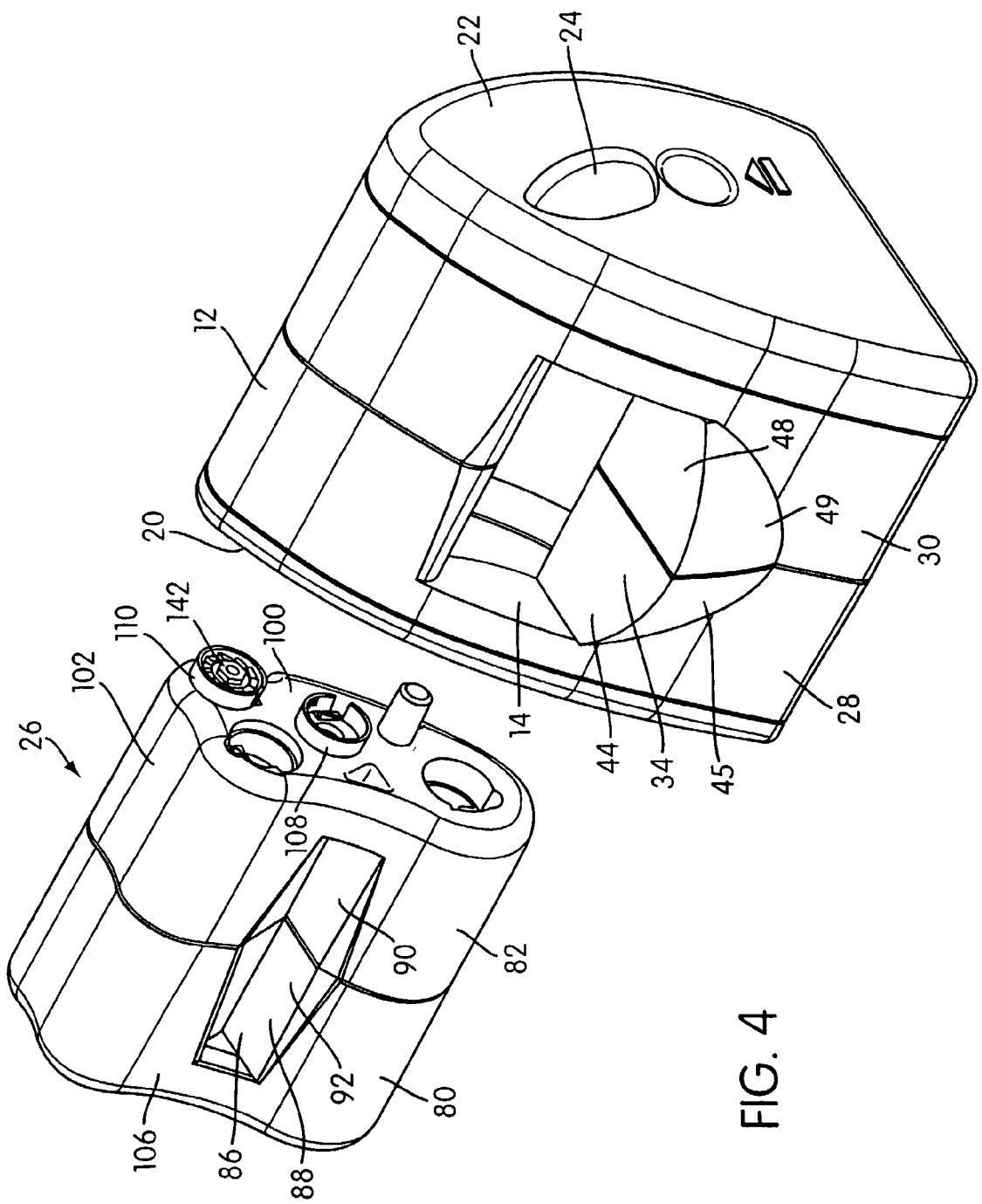
FIG. 4 is a perspective view of the apparatus of FIG. 1 with the removable cartridge thereof ready to be inserted into the apparatus, the perspective being taken from the front thereof.
Figure 5:
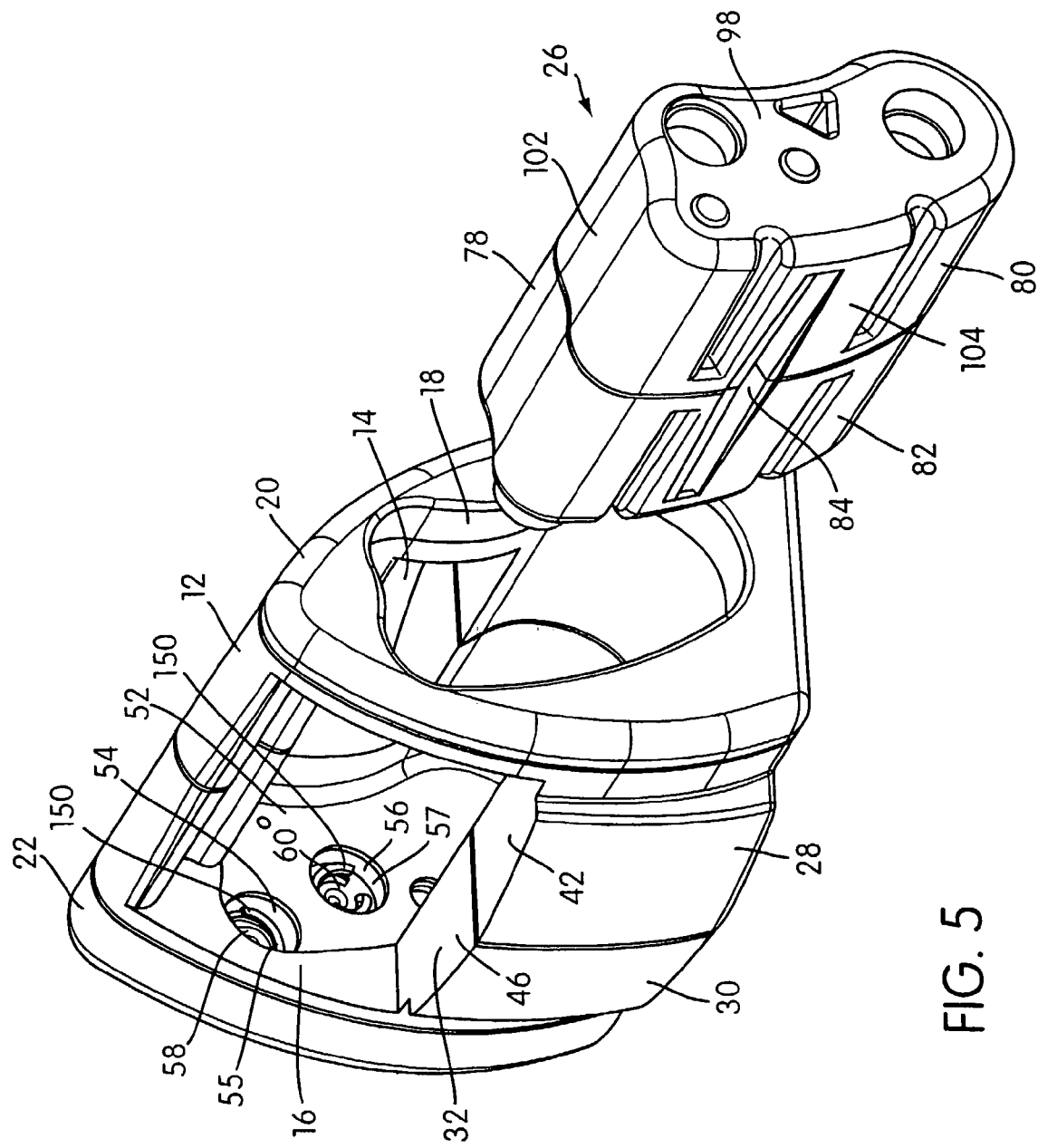
FIG. 5 is a perspective view similar to FIG. 4 taken the rear thereof.
Figure 6:
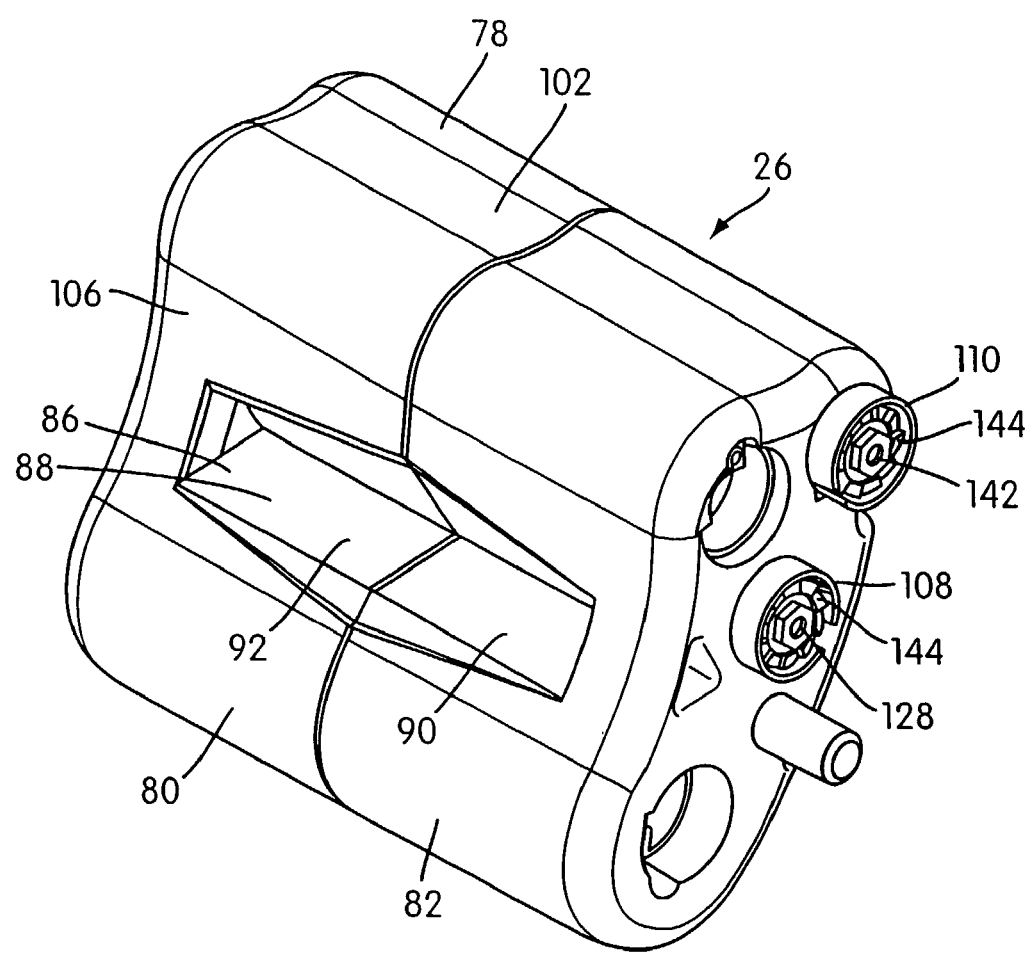
FIG. 6 is a perspective view of the removable cartridge shown in isolation from the apparatus, the view being taken from the front thereof.
Figure 7:
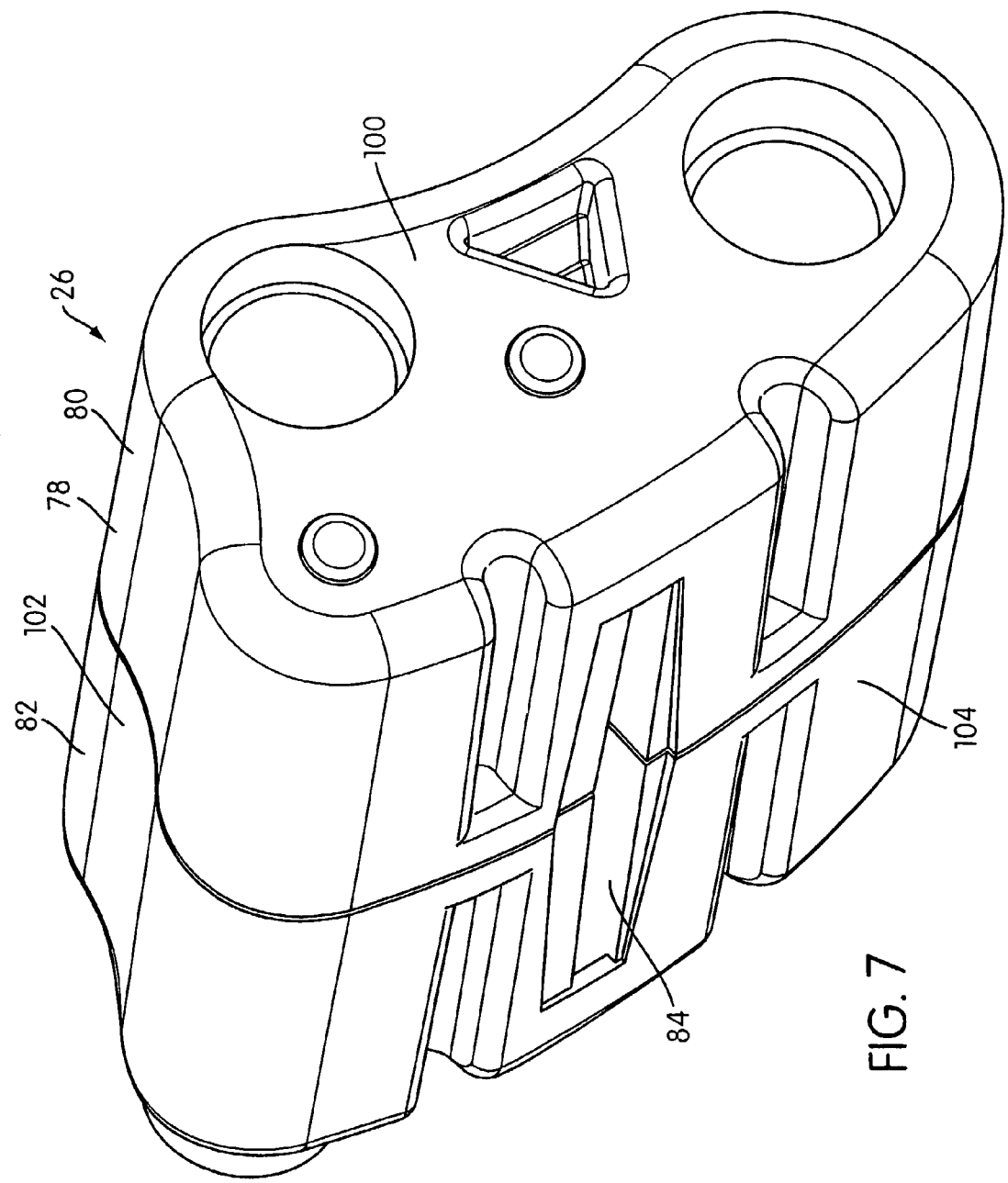
FIG. 7 is a perspective view similar to FIG. 6 taken from the rear side thereof.

As can be best seen from FIG. 3, the frame 12 comprises two molded plastic body halves 28, 30 which are secured together by fasteners or any other suitable arrangement. The side walls 20, 22 are fastened to the exterior of the body halves 28, 30 by fasteners, adhesives, a snap fit relation, or any other suitable attachment arrangement. The frame 12 has a forwardly extending substrate supporting surface 32 disposed adjacent to the discharge opening 16. The frame 12 also has a rearwardly extending substrate supporting surface 34 located adjacent the feeding opening 14. These surfaces 32, 34 will support substrates being fed into and discharged from the apparatus 10.

Side wall 20 has an opening 36 formed therethrough and body half 28 also has an opening 38 formed therethrough. These openings 36, 38 have substantially identical configurations and face laterally outwardly in alignment with one another when the frame 12 is assembled to define the aforesaid cartridge receiving opening 18.

Body half 28 has an integrally formed inwardly extending lower arcuate wall 40 and body half 30 has a corresponding similar inwardly extending lower arcuate wall (not shown) which engages lower arcuate wall 40 when the body halves 28, 30 are assembled together. The lower arcuate walls extend along the lower edge of the opening 38 on body half 28.

A forwardly extending wall member 42 and a rearwardly extending wall member 44 are formed integrally with opposing ends of the lower arcuate wall 40. A convex wall member 45 is formed integrally with wall member 44 opposite lower arcuate wall member 40. A forwardly extending wall member 46 and a rearwardly extending wall member 48 are formed integrally with the lower arcuate wall on body half 30. A convex wall member 49 similar to wall member 45 is formed integrally with wall member 45 opposite the lower arcuate wall member. When the two body halves 28, 30 are assembled together surfaces of the forwardly extending wall members 42, 46 cooperate to define substrate supporting surface 32 and surfaces of the rearwardly extending wall members 44, 48 cooperate to define substrate supporting surface 34.

An integrally formed upper arcuate wall 50 extends inwardly from body half 28. The upper arcuate wall 50 extends along the top edge of the opening 38 on body half 28. Body half 30 has a similar integrally formed upper arcuate wall which is not shown and engages the upper arcuate wall 50 when the body halves 28, 30 are assembled together.

Body half 30 has an integrally formed side wall portion 52 which protrudes outwardly therefrom in a convex manner. The side wall portion 52 has a configuration similar to the cartridge receiving opening 18. Specifically, the side wall portion 52 is located directly opposite the cartridge receiving opening 18 when the frame 10 is assembled and is formed integrally with the lower arcuate wall portion of body half 28. The side wall portion 52 has two cylindrical portions 54, 56 defining cylindrical openings 55, 57 for receiving one-way gears 58, 60 therein, respectively.

Side wall 20 has an aperture (not shown) formed therethrough. The crank handle 24 is positioned adjacent to the aperture and a shaft portion 62 of a drive gear 64 is connected to the crank handle 24 through the aperture. The connection may be threaded, snap fit, adhesive or any other suitable connecting arrangement.

The drive gear 64 has a generally circular pulley portion 66 with a generally circular groove 68 extending therearound. One-way drive gear 58 also has a generally circular pulley portion 70 with a generally circular groove 72 formed therearound. A tensioned driving element in the form of an elastomeric cord 73 extends around both pulley portions 66, 70, and is received in the grooves thereof 70, 72. This pulley arrangement causes the one-way gear 58 to rotate as the drive gear 64 is being rotated by the crank handle 24.

Figure 9:
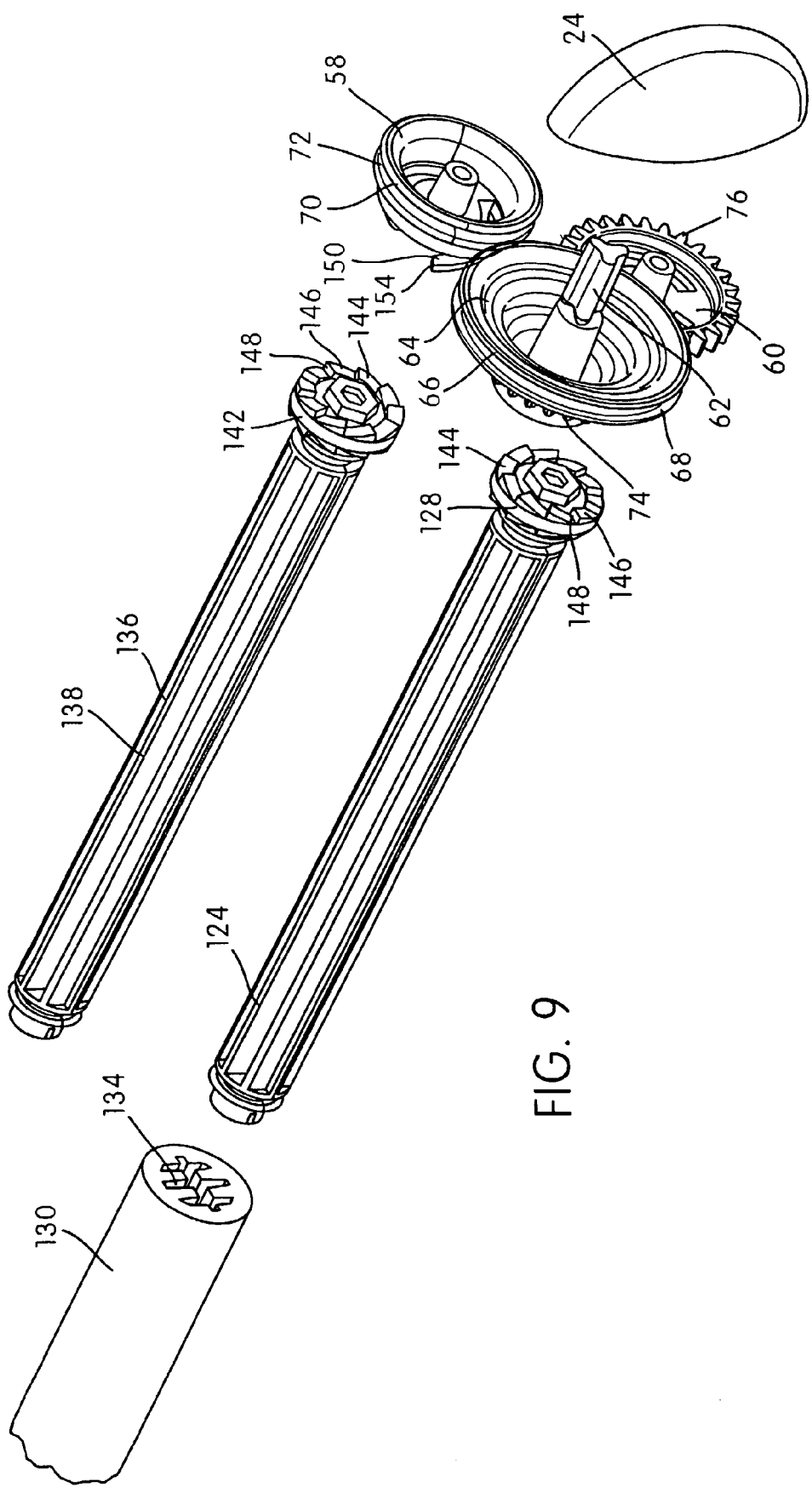
FIG. 9 is a perspective view showing a nip roller and a take-up roll of the cartridge isolated from the cartridge body and one-way drive gears and the crank handle isolated from the apparatus frame.
Figure 10A:
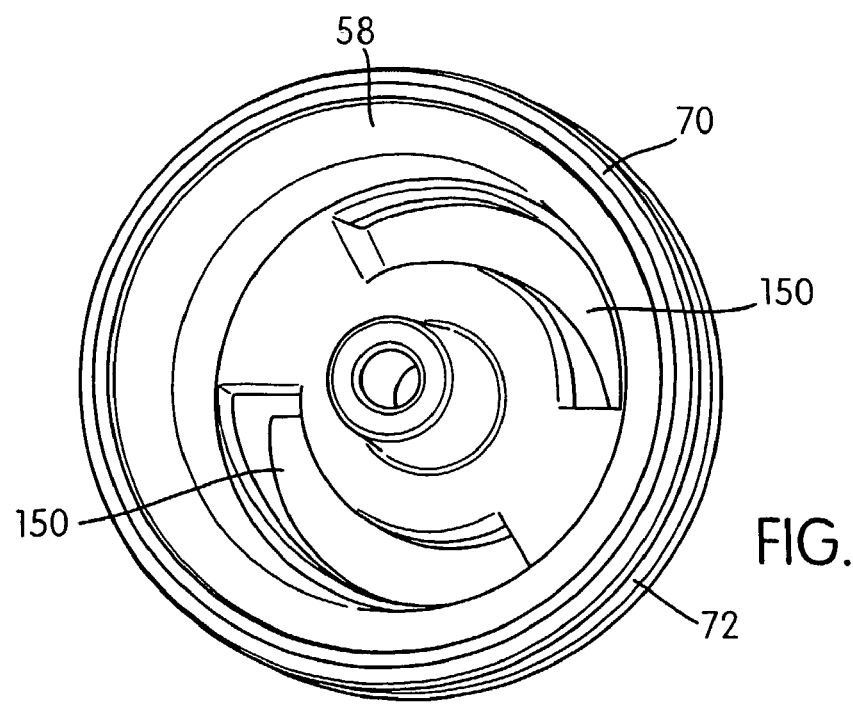
FIG. 10a is a perspective view of a one-way drive gear used to drive the take-up roll.
Figure 10B:
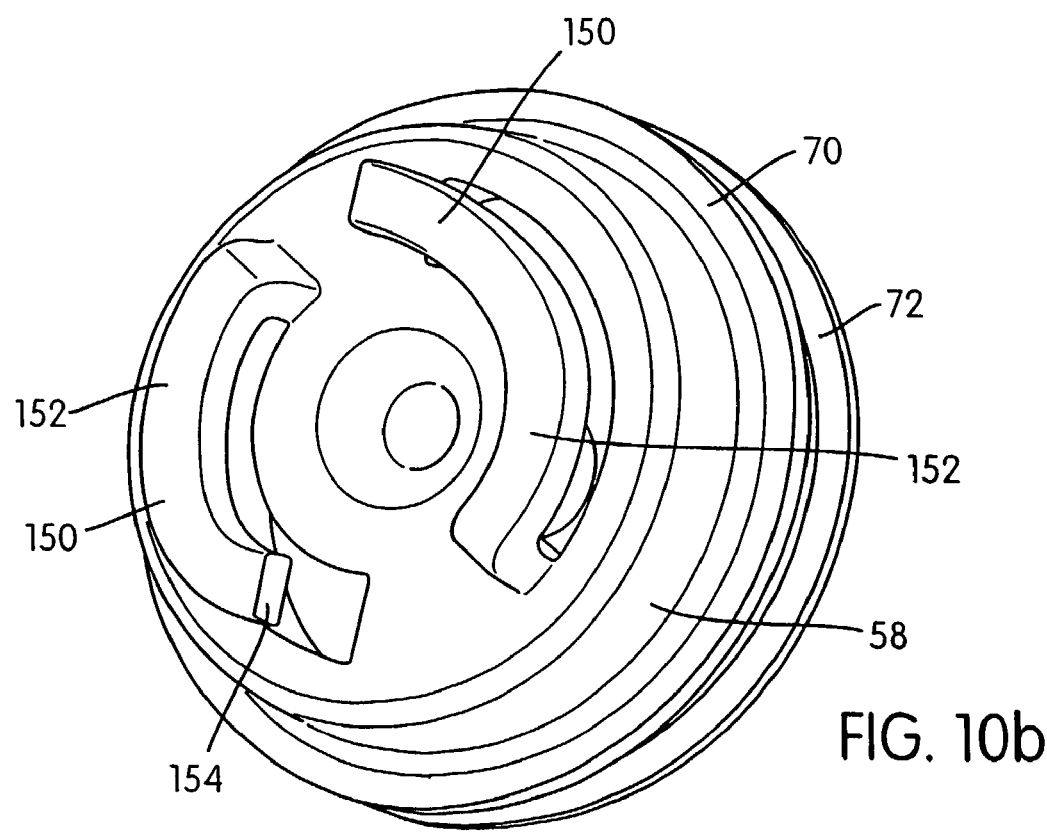
FIG. 10b is a view similar to FIG. 10a taken from the opposing side.
Figure 11A:
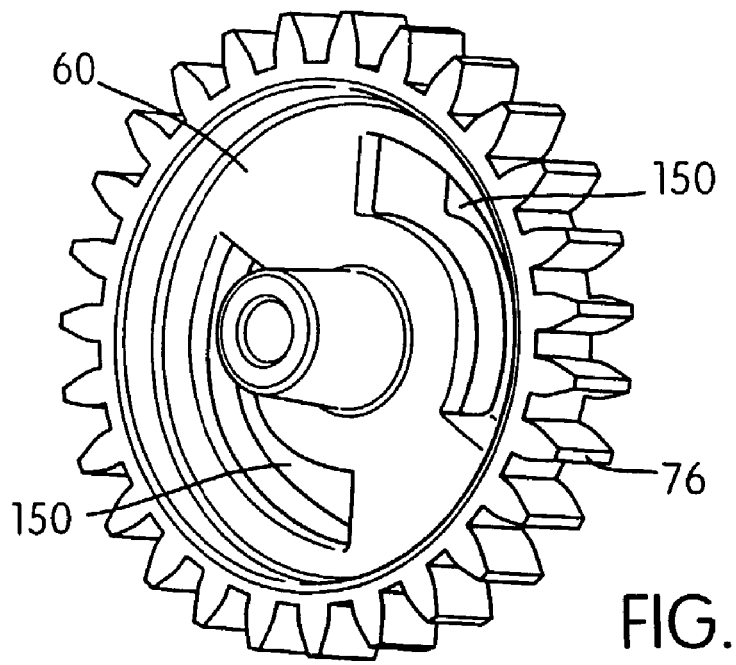
FIGS. 11a and 11b are perspective views of a one-way drive gear used to drive the nip roller.
Figure 11B:
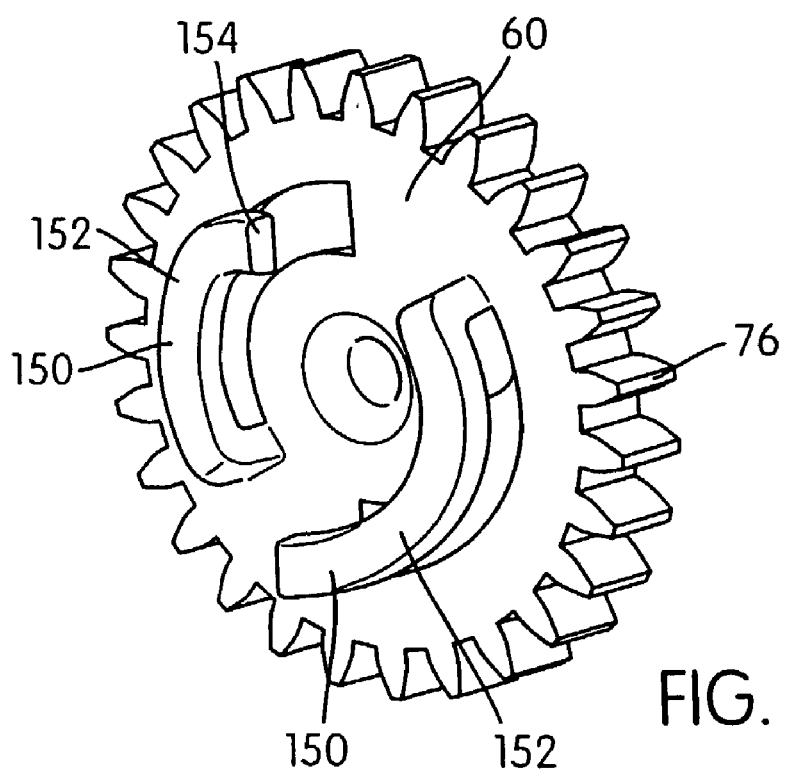
Figure 12:
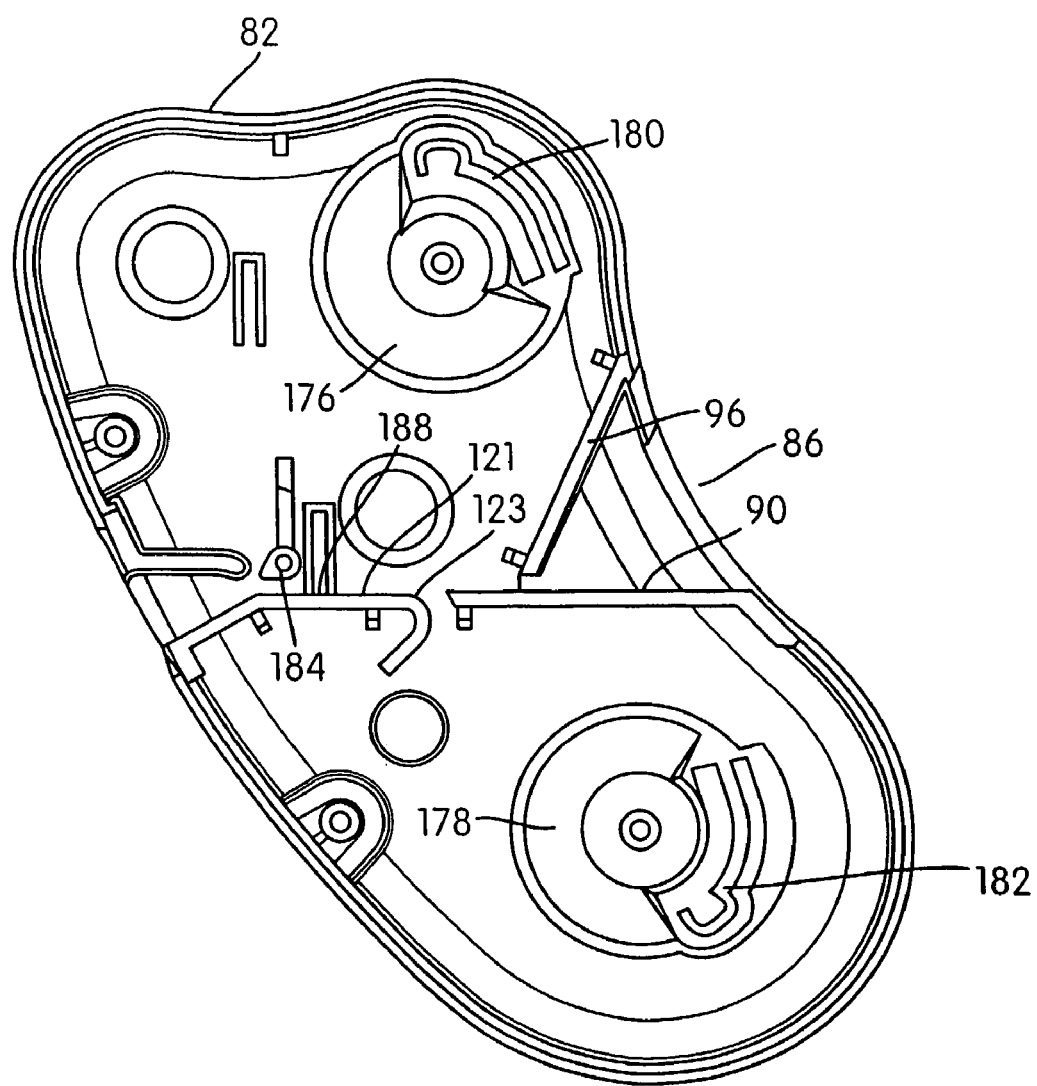
FIG. 12 is a side view showing the interior of one-half the removable cartridge.

The drive gear 64 also has a set of gear teeth 74 (seen in FIG. 9) formed thereon axially inwardly of the pulley portion 66. One-way drive gear 60 has a set of gear teeth 76 which engage with gear teeth 74 in an intermeshed relationship so that rotation of the drive gear 64 will also cause rotation of one-way gear 60 as a result of the intermeshed gear relationship.

Figure 8:
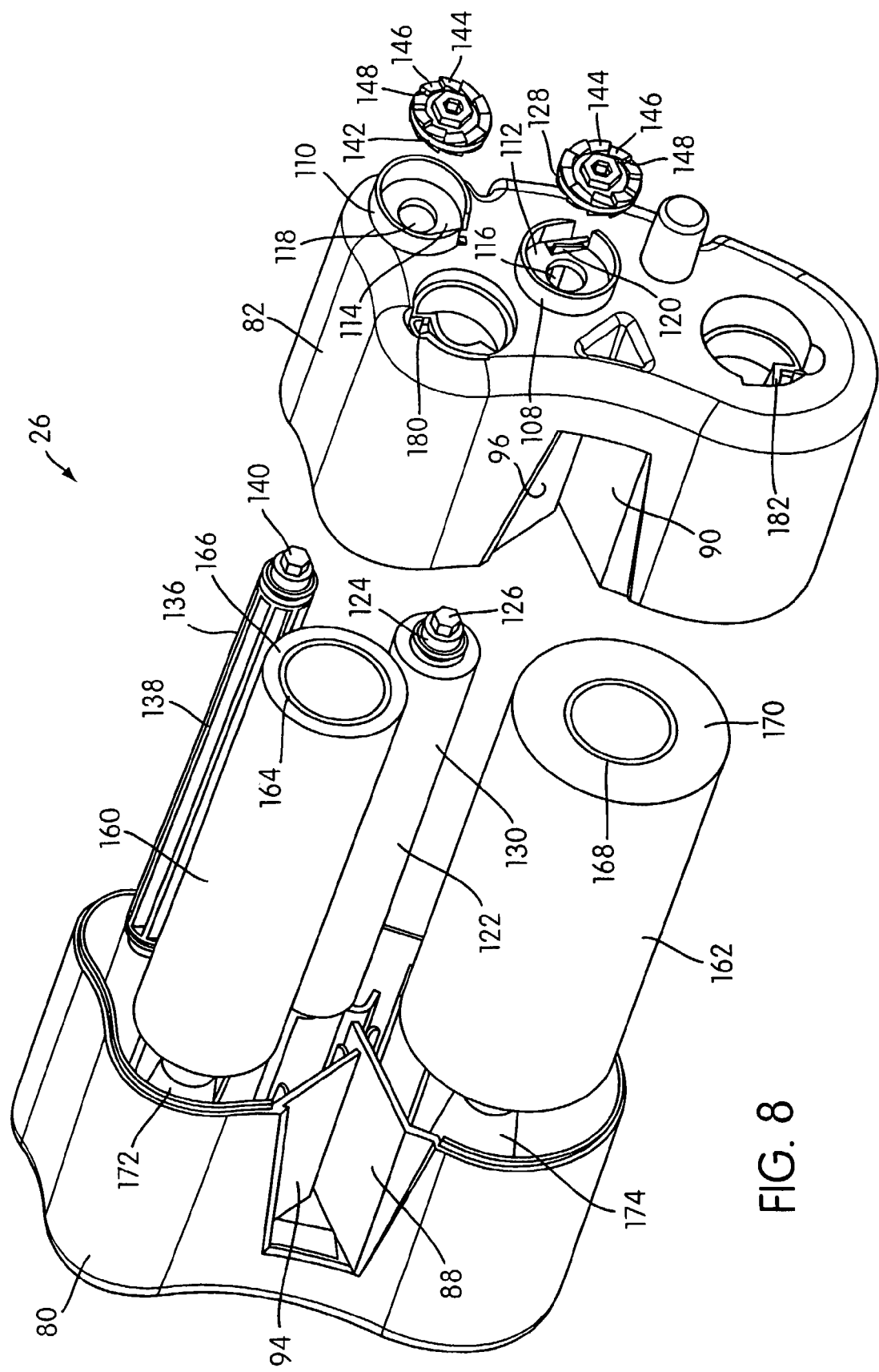
FIG. 8 an exploded perspective view of the removable cartridge.

The removable cartridge 26 comprises a cartridge body structure 78 formed by assembling two molded plastic cartridge body halves 80, 82 together. The cartridge body structure 78 has a discharge opening 84 and a feeding opening 86. As best seen in FIG. 8, each cartridge body half 80, 82 has a substantially flat wall portion 88, 90 extending inwardly from the feeding opening 86. When the body halves 80, 82 are assembled together these wall members 88, 90 are engaged with one another to define a substantially flat substrate supporting surface 92. When the cartridge 26 is inserted into the frame 12 the substrate supporting surface 92 is continuous with substrate supporting surface 34 at the feeding opening 14 of the frame 12. Each cartridge body half 80, 82 also has an integrally molded protecting wall member 94, 96 extending inwardly and downwardly towards wall members 88, 90 and spaced thereabove. These inwardly and downwardly extending wall portions 94, 96 are engaged with one another when the cartridge body halves 80, 82 are assembled together and prevent items other than substrates and articles of similar size from being inserted into the cartridge 26 through the feeding opening 86.

When the cartridge 26 is assembled, the body halves define a pair of opposing side walls 98, 100, a top wall 102, a front wall 104, and a rear wall 106. The feeding opening 86 is formed in the rear wall 106 and the discharge opening 84 is formed in the front wall 104. The top wall 102, the front wall 104, and the rear wall 106 meet at three rounded corner portions.

Side wall 100 has a pair of generally cylindrical gear receiving portions 108, 110 extending outwardly therefrom. Each gear receiving portion 108, 110 has an inner wall portion 112, 114 with an opening 116, 118 formed therethrough. A triangular stop member 120 extends outwardly from each inner wall portion 112, 114.

A generally cylindrical nip roller 122 extends transversely inside the cartridge 26. The roller 122 has a central shaft 124 with a hexagonal gear connection portion 126 at one opposing end thereof. The gear connection portion 126 is connected to a one-way clutch gear 128 which is received within cylindrical gear receiving portion 108 through opening 116. The other end of the nip roller 122 is rotatably journaled inside the side wall 98 so that rotation of one-way slip clutch gear 128 rotates the nip roller 122. The shaft 124 is covered by a rubber outer sleeve 130. The shaft 122 has a set of ribs 132 which are received within slots 134 inside sleeve 130 to prevent the sleeve 130 from rotating relative to the shaft 122.

Below the nip roller 122 and engaged therewith is a fixed nip roller bearing structure 121 with a rounded end portion 123. When substrates are fed between the nip roller 122 and the rounded end portion 123, the nip roller 122 is rotated to feed the substrates forwardly and to apply pressure to the substrates in cooperation with the rounded end portion 123 of the fixed nip roller bearing structure 121. Together, the nip roller 122 and the nip roller bearing structure 121 may be considered to comprise a pressure applying assembly, generally indicated at 125. The term pressure applying assembly 125 encompasses arrangements with one nip roller (as shown) bearing against a fixed structure, two nip rollers (as shown in the aforementioned '962 and '417 patents), or even three or more nip rollers for complicated high-end applications. Further, the term pressure applying assembly encompasses arrangements with two fixed structures which are disposed closely adjacent one another such that substrates fed therebetween are compressed together to effect application of pressure. Basically, the term pressure applying assembly is intended to encompass any conceivable arrangement for applying pressure to substrates.

A generally cylindrical take-up roll 136 extends transversely inside the cartridge 26. The take-up roll 136 has a central shaft 138 with a configuration similar to the shaft 124 of the nip roller 132. The shaft 138 has a hexagonal gear connecting portion 140 on one end thereof. The gear connecting portion 140 is connected through opening 118 to a one-way slip clutch gear 142 which is received within the gear receiving portion 110. The other end of the take-up roll shaft 138 is rotatably journaled inside side wall 98 so that rotation of one-way slip clutch gear 142 rotates the take-up roll 136.

Each slip clutch gear 128, 142 has a generally circular configuration with opposing faces. A set of clutch gear teeth 144 are formed on each face of each clutch gear 128, 142. Each individual clutch gear tooth 144 has a sloped surface 146 which extends both circumferentially and axially with respect to the face of the gear 128, 144 on which it is formed and a generally axially extending engaging surface 148 which intersects with the upper end of the sloped surface 146.

Each one-way slip clutch gear 58, 60 has a pair of integrally molded one-way driving members 150 extending both circumferentially and axially therefrom. Each drive gear 58, 60 has a circumferentially and axially extending sloped surface 152 and a generally axially extending engaging surface 154 at the free end thereof. The one-way clutch gears 58, 60 are positioned inside the cylindrical gear receiving portions 108, 110, respectively, with the driving members 150 thereof extending inwardly towards the apparatus interior.

When the cartridge 26 is inserted through the cartridge receiving opening 18 and into the frame 12, the lower arcuate wall member 40 and the upper arcuate wall members 50 cooperate to guide the cartridge 26 into its operating position and support it thereat. In this operating position, the one-way clutch gears 128, 142 engage one-way slip clutch gears 58, 60, respectively. Manual rotation of the actuator 24 in a normal driving direction (clockwise as viewed in FIG. 3) rotates drive gear 64 so as to rotate one-way gear 58 in a clockwise driving direction and one-way gear 60 in a counterclockwise driving direction. As a result of this rotation, the engaging surfaces 154 on driving members 152 engage the engaging surface 148 of each one-way clutch gear 128, 142 to drive take-up roll 136 in a clockwise driving direction and nip roller 122 in a counterclockwise direction.

Manual rotation of the crank handle 24 in a reversing direction opposite the driving direction rotates one-way drive gear 58 in a counterclockwise direction and rotates one-way drive gear 60 in a clockwise direction. As a result of this rotation, the sloped surfaces 152 of driving members 150 ride or slip over the sloped surfaces 146 so that the one-way clutch gears 128, 142 are not rotated. Further, the stop members 120 are positioned such that the engaging surfaces 148 of the clutch gear teeth 144 will abut the stop members 120 to prevent rotation of the clutch gears 128, 142 opposite their respective driving directions and hence prevent counter-rotation of the nip roller 122 and the take-up roll 136. These interengaging pairs of slip clutch gears may be considered to constitute a one-way clutch mechanism.

A pair of feed rolls 160, 162 are mounted within the cartridge 26 and extend in a transverse direction. The upper or first feed roll 160 has a generally cylindrical cardboard core 164 and a supply of an adhesive mask substrate 166 wound around the core 164. The preferred adhesive mask substrate is a thin plastic sheet, but any substrate material having an affinity for allowing an adhesive to bond thereto may used. Such materials may include paper, cloth or any other suitable material.

The lower or second feed roll 162 has a generally cylindrical core 168 and a supply of an adhesive transfer substrate 170 wound around the core 168. The adhesive transfer substrate 170 is preferably a differential release liner with one or more layers of a pressure-sensitive adhesive coated on one side thereof. A differential release liner is a paper sheet which is coated with silicone or a similar material on one or both sides such that one side has a lower affinity for allowing adhesives to bond thereto than the other side. The other side may or may not be treated as long as the two sides have different adhesive affinities. The pressure-sensitive adhesive layer(s) are coated on the less treated side of the release liner and the substrate 170 is wound around the core 168 with the adhesive layer(s) facing generally radially inwardly and the more treated side of the release liner facing generally radially outwardly. Thus, the adhesive layer(s) on one portion of the release liner will be engaged with the more treated side of a radially inwardly adjacent portion of the release liner. When the adhesive substrate 170 is unwound, the adhesive layer(s) remain bonded to the less treated or non-treated side of the release liner portion being peeled away because the more treated side of the radially inwardly adjacent release liner portion has a lower affinity for allowing adhesive to bond thereto. The adhesive layer may be a single layer of a permanent pressure-sensitive adhesive, such as an acrylic emulsion or rubber based adhesive, as taught in the aforementioned '417 and '962 patents, the entirety of which are hereby incorporated into the present application. The adhesive layer may also comprise a permanent adhesive layer and a repositionable adhesive layer as disclosed in U.S. Pat. application of Neuburger, Ser. No. 09/343,676, the entirety of which is hereby incorporated into the present application by reference.

Figure 13:
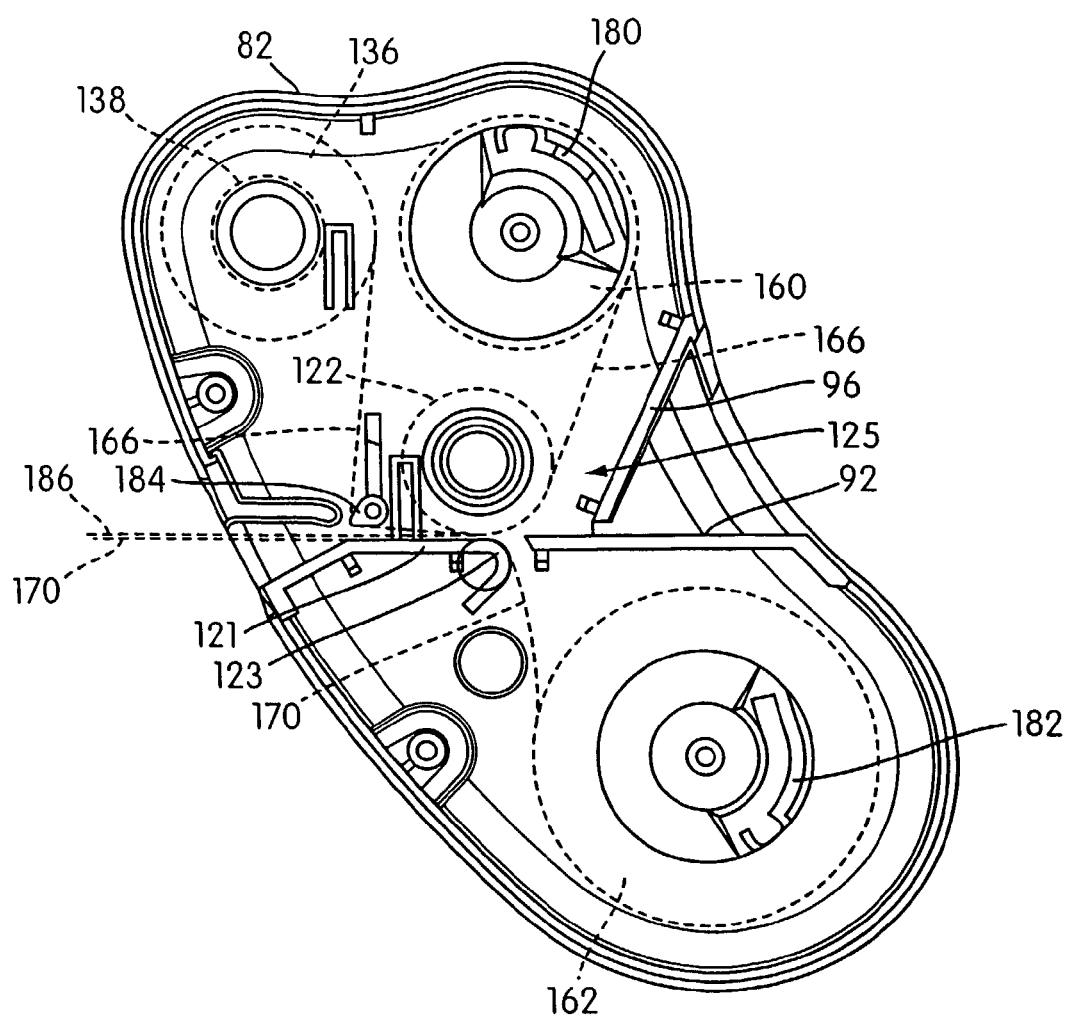
FIG. 13 is a view similar to FIG. 12, with the feed rolls, the take-up rolls, and the nip roller mounted in place and being shown in phantom with the mask and transfer substrates disposed in their operative positions.
Figure 14:
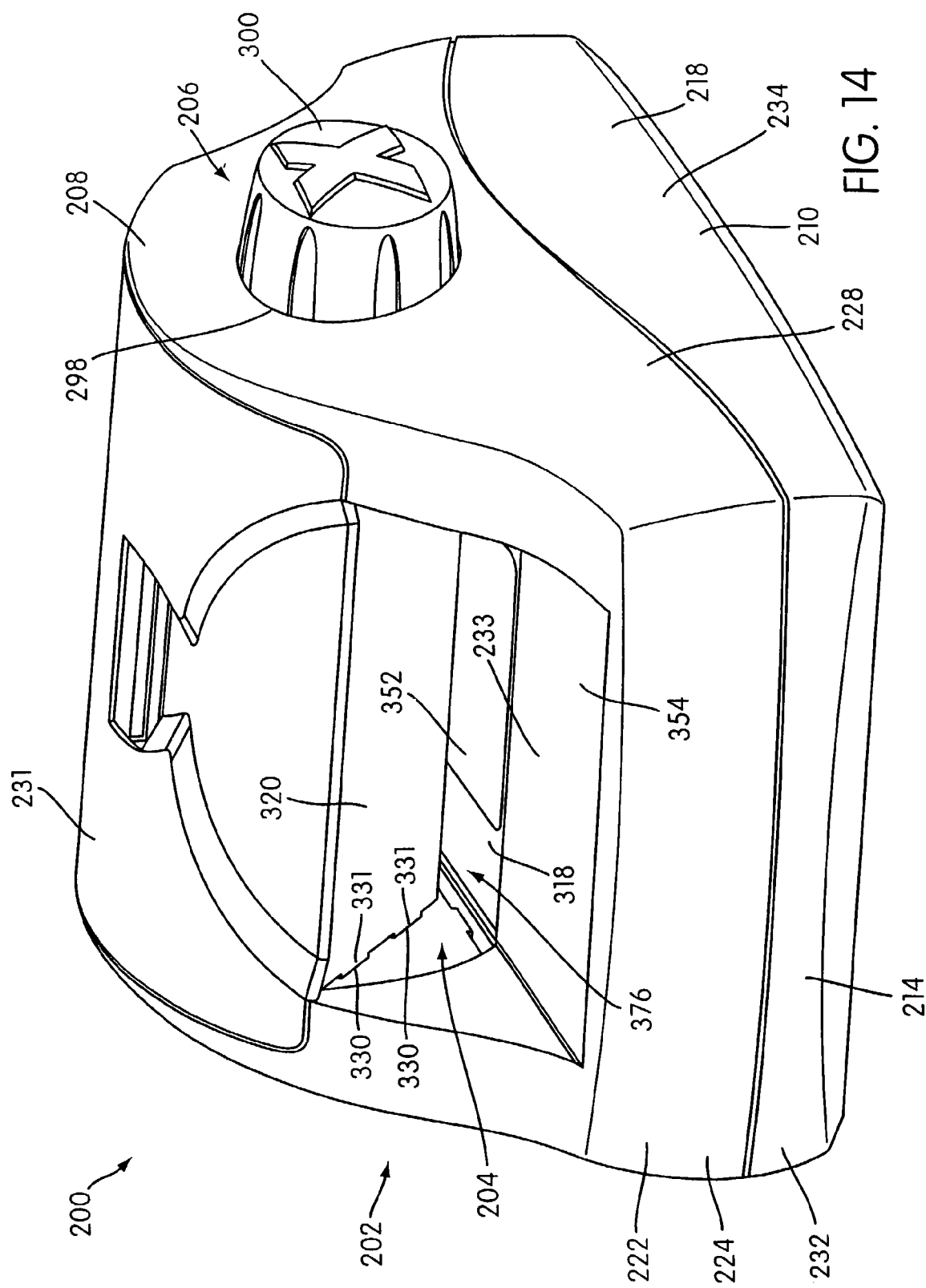
FIG. 14 is a perspective view of second embodiment of an adhesive transfer apparatus constructed in accordance with the principles of the present invention.

As can be best seen in FIG. 8, cartridge body half 80 has a pair of integrally molded frustroconical feed roll mounting portions 172, 174. The upper and lower feed rolls 160, 162 are rotatably mounted on these mounting portions 172, 174 with the mounting portions 172, 174 being received inside the feed roll cores 164, 168. As best seen in FIGS. 13 and 14, the other cartridge body half 82 also has a pair of partial frustroconical mounting portions 176, 178. The mounting portions 176, 170 are only two-thirds complete in the circumferential direction of the imaginary cone which defines the frustroconical shape of the mounting portions 176, 178. A braking member 180, 182 integrally formed with the cartridge body half 82 occupies the space where the remainder of the partial frustroconical mounting portions would otherwise be located. The upper and lower feed rolls 160, 162 are rotatably mounted on these mounting portions 176, 178 with the mounting portions 176, 178 being received inside the cores 164, 168. The braking members 180, 182 extend inwardly into the cartridge 26 and the cores 164, 168 engage the braking members 180, 182 to flex them slightly outwardly. The resiliency of the plastic material forming the braking members 180, 182 biases the brakes 180, 182 inwardly against the cores 164, 168. As a result of this inward bias, friction will be created between the brakes 180, 182 and the cores 164, 168 during rotation of the feed rolls 160, 162. This frictional resistance will pre-tension the substrates as they are being unwound and prevent overrunning of the feed rolls 160, 162. Also, the biased engagement between braking members 180, 182 and the cores 164, 168 will prevent the feed rolls 160, 162 from rotating until a predetermined amount of torque or rotational force is applied to the feed rolls 160, 162. Thus, the braking members 180, 182 also prevent feed roll rotation when the cartridge 26 is not being used.

One advantage of the frustroconical mounting portions 172, 174, 176, 178 is that a pre-tensioning force is created even if the feed roll cores 164, 168 do not have a wide enough inner diameter to slide over mounting portions 176, 178 far enough reach the braking members 180, 182. In that event, the interior of the feed roll cores 164, 168 will be tightly engaged with the exterior surfaces of the mounting portions 172, 174, 176, 178 in a wedged relationship to affect the braking/pre-tensioning effect described above.

As shown in FIG. 13, the adhesive mask substrate 166 is disposed in its operating position by unwinding a lead end portion thereof and feeding the lead end portion into the nip roller assembly 125. The lead end portion is then fed upwardly over a pivotally mounted substrate guiding member 184 and connected with the shaft 138 of the take-up roll 136. The lead end portion may be connected by inserting the lead end portion between the ribs on the shaft 138 and rotating the shaft 138 until the mask substrate 166 is wound over the lead end portion a sufficient number of times to be securely held. Also, the connection may be provided by adhering the lead end portion to the shaft 138.

Alternatively, the mask substrate 166 can be unwound and the lead end portion thereof can be attached to the take-up roll shaft 138 before the cartridge 26 is assembled. In that event, the mask substrate 166 would be held loosely between the upper feed roll 160 and the take-up roll 136 and extending over the guiding member 184. The feed roll 160 and the take-up roll 136 are then mounted to one of the cartridge body halves 80, 82. The nip roller 122 is then rotatably mounted with the mask substrate 166 positioned between the fixed supporting structure 121 and the nip roller 122. When the cartridge 26 is finally assembled, the take-up roll 136 may be rotated to take-up any slack in the mask substrate 166.

The adhesive transfer substrate 170 may then be disposed in its operating position by inserting a lead end portion thereof into the nip roller assembly 125 between the nip roller 122 and the fixed nip roller bearing structure 121. The nip roller 122 is rotated to feed the lead end portion of the adhesive transfer substrate 170. As a result of this feeding, the adhesive transfer substrate 170 will adhesively bond to the mask substrate 166. This adhesive bonding prevents the transfer substrate 170 from backing out of the pressure applying assembly 125 because the take-up roll 136 cannot rotate in an unwinding direction due to stop member 120.

With the transfer substrate 170 and the mask substrate 166 in their respective operating positions, the cartridge 26 may be inserted into the frame 10 through the cartridge receiving opening 18. The one-way clutch gears 142, 144 of the cartridge 26 will engage the one-way drive gears 58, 60 of the frame 12. In this position, rotation of the actuator will cause rotation of both the take-up roll 136 and the nip roller 122 in the manner described above.

To perform an adhesive transfer operation, a selected substrate 186 is fed through the frame feeding opening 14, the cartridge feeding opening 86, and into the pressure applying assembly 125 with the mask substrate 166 and the transfer substrate 170 disposed in their operating positions on respective opposing sides thereof. The actuator 24 is rotated or otherwise manually operated (or power operated) so that the nip roller 122 and the take-up roll 136 rotate simultaneously. Together, the mask substrate 166, the selected substrate 186, and the transfer substrate 170 are fed through and discharged from the pressure applying assembly 125. During this feeding the nip roller 122 cooperates with the fixed nip roller bearing structure 121 to apply pressure to the three substrates so that the pressure-sensitive adhesive on the transfer substrate 170 is bonded to (a) the selected substrate 186 and (b) any portions of the mask substrate 166 which extend around the periphery of the selected substrate 186. The rotation of the take-up roll 136 pulls the mask substrate 166 upwardly away from the selected substrate 186 and the transfer substrate 170 as they are discharged from the pressure applying assembly. As a result, any portions of the adhesive layer which are bonded to the mask substrate 166 are stripped away from the release liner of the transfer substrate 170. In other words, the adhesive layer portions bonded to the mask substrate 166 will remain bonded to the mask substrate 166 as the substrate 166 is being taken up by take-up roll 136.

It should be noted that the actuator 24 may be geared only to the take-up roll 136 via a one-way gear and the nip roller 122 may remain unconnected to the actuator. In this arrangement, the actuator 24 would rotate the take-up roll 136 such that the take-up roll 136 pulls the substrates through the pressure applying assembly. The bonding between the substrates in this situation would be sufficient to ensure that pulling the mask substrate 166 with the take-up roll 136 also pulls the transfer substrate 170 without significant slippage therebetween. This arrangement obviates the cost of gearing the nip roller 122 to the actuator 24.

The transfer substrate 170, with the selected substrate 186 bonded thereto, continues to move out the cartridge discharge opening 84. An upwardly facing surface 188 of the fixed substrate supporting structure 121 and the substrate supporting surface 32 at the frame discharge opening 16 support the transfer substrate 170 (and hence the selected substrate 186) in a substantially flat relation as they are being discharged from the pressure applying assembly 25. By supporting the transfer and selected substrates 170, 186 in a substantially flat relation, downward bending or curling of the substrate 170, 186 is substantially prevented. The frame 12 may carry a cutting device for severing the discharged substrates, such as the one shown in U.S. patent application of Paque, Ser. No. 09/189,273, the entirety of which is hereby incorporated into the present application by reference, or any other suitable arrangement. Otherwise, scissors or tearing may be used to cut the transfer substrate 170.

The resulting article is the transfer substrate 170 and the selected substrate 186 bonded together by one or more adhesive layers sandwiched therebetween. Substantially all of the adhesive not covered by the selected substrate 186 has been stripped away by the mask substrate 160, which is now wound up on the take-up roll 136. Thus, a user can simply peel back the selected substrate 186 from the transfer substrate 170 and adhere the substrate 186 to any desired contact surface. There is no need to handle or discard the mask substrate 166 because it is wound up on the take-up roll 136.

FIG. 14 illustrates a perspective view of a second embodiment of an adhesive transfer apparatus 200 constructed in accordance with the principles of the present invention. The apparatus 200 comprises a frame, generally indicated at 202, a removable cartridge, generally indicated at 204, and an actuator, generally indicated at 206.

The frame 202 comprises an outer decorative shell, generally indicated at 208. The shell 208 includes an injection molded plastic bottom pan portion 210 having a floor 212, a lower front wall portion 214, a lower rear wall portion 216, and lower side wall portions 218, 220 all integrally molded together. The shell 208 also includes an injection molded central body portion 222 having an upper front wall portion 224, an upper rear wall portion 226, an upper side wall portion 228, and an upper side wall portion 230 all integrally molded together. An injection molded, generally C-shaped cover member 231, which is part of the shell 208, removably mounts between the upper edges of the upper side wall portions 228, 230 and has a shape that is complementary to those edges. The central body portion 222 mounts on top of the bottom pan portion 210 with the front wall portions 214, 224 cooperating to form a front wall 232, the rear wall portions 216, 226 cooperating to form a rear wall 236, side wall portions 218, 228 cooperating to form side wall 234, and side wall portions 220, 230 cooperating to form the opposite side wall 238.

Figure 15:
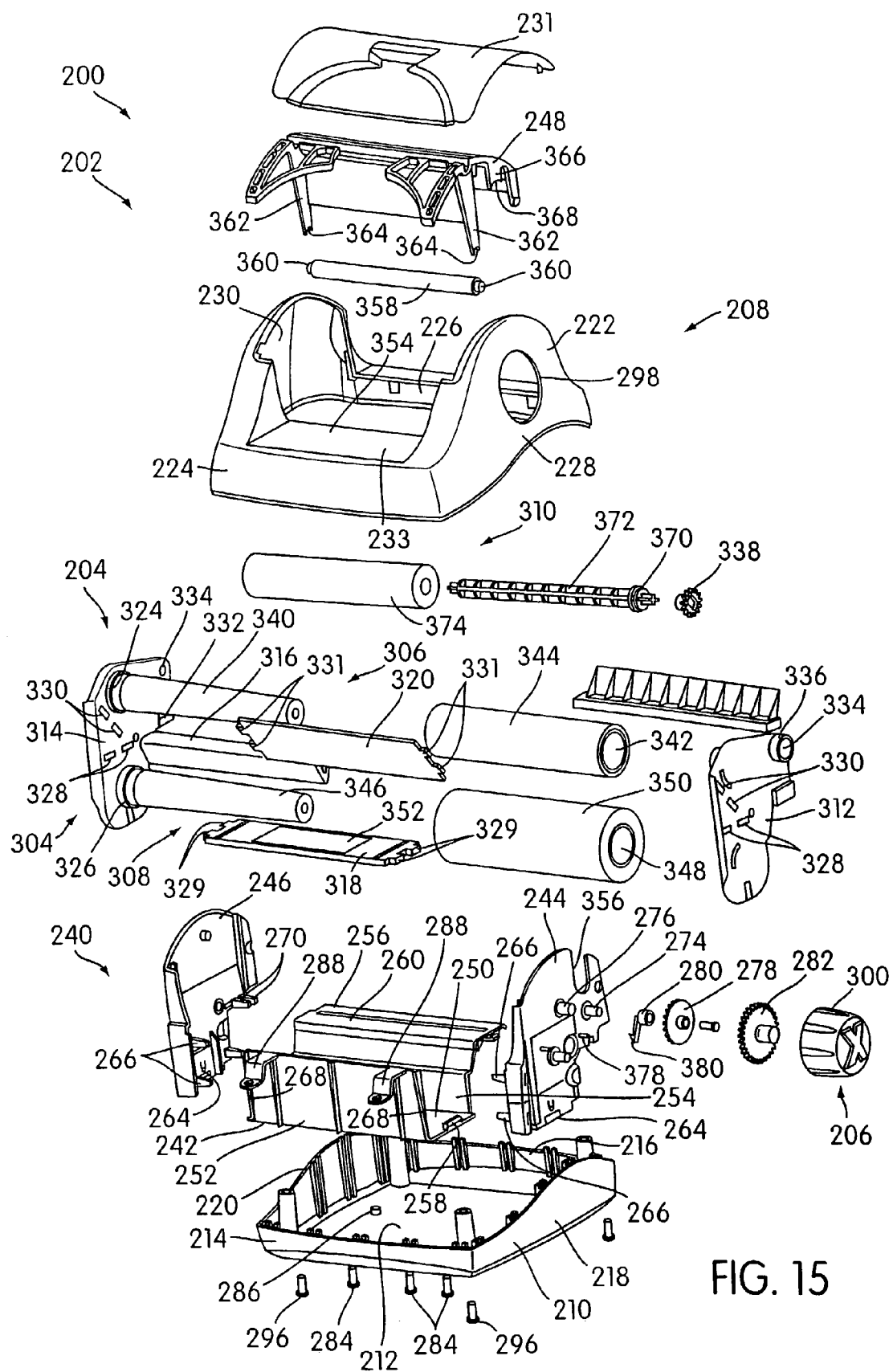
FIG. 15 is an exploded perspective view of the apparatus of FIG. 14.

The frame 202 also includes an internal sub-frame 240. This sub-frame can be best appreciated from FIG. 15. The sub-frame 240 includes an injection molded main sub-frame body portion 242, a pair of injection molded opposing side walls 244, 246, and an injection molded upper sub-frame portion 248.

The sub-frame main body portion 242 has a generally planar bottom wall 250, a front wall 252, a rear wall 254, and a generally planar substrate supporting wall 256 all integrally molded together. The bottom wall 250 has a pair of resilient tabs 258 on the side edges thereof. The substrate supporting wall 256 has a generally planar substrate supporting surface 260 with a groove 262 extending laterally thereacross.

The side walls 244, 246 each have a tab receiving opening 264 at the lower edge thereof and a plurality of tabs 266 extending inwardly from forward and rearward edges thereof. The front and rear walls of the sub-frame main body portion 242 have ribs 268 formed on the side edges thereof. Also, the side walls 244, 246 each have a pair of cooperating tabs 270 that extend inwardly adjacent and opposite one another. The substrate supporting wall 256 has a pair of tab engaging posts 272 extending downwardly therefrom. The side walls 244, 246 are assembled by placing the tab receiving openings 264 over the tabs 258 and pivoting the walls 244, 246 upwardly so that the tabs 266 engage and ride over the ribs 268 and then resiliently snap over the same to secure the walls 244, 246 in upright relation. Likewise, the cooperating pair of tabs 270 ride over the posts 272 and then resiliently snap over the same on opposing sides thereof to further secure the walls 244, 246.

The side wall 244 of the sub-frame 240 has a pair of generally cylindrical gear mounting posts 274, 276 formed integrally thereon. A toothed idler gear 278 is rotatably mounted on the gear post 274 and an anti-reversing member 280 is also rotatably mounted on post 274. A knob-driven gear 282 is rotatably mounted on post 276. The gears 278 and 282 are intermeshed so that rotation of one counter-rotates the other.

The assembled sub-frame 240 (minus the upper sub-frame cover portion 248) is mounted inside the bottom pan portion 210 and is secured in place by a plurality of threaded fasteners 284 that are inserted through apertures 286 on the floor 212 and threaded into apertures on the bottom wall 250 of the sub-frame main body 242. The central shell body portion 222 mounts on top of the pan portion 210 and over the sub-frame 240. The front wall 252 of the sub-frame body portion 242 has a pair of tabs 288 with openings formed therethrough and the substrate supporting wall 256 of the sub-frame body portion 242 likewise has a pair of tabs 290 with openings and formed therethrough. The central body portion 222 of the shell 208 has two pairs of posts 292, 294 with threaded bores therein. These posts 292, 294 engage the tabs 288, 290 so that the openings and bores are aligned. Threaded fasteners 296 are inserted therein to secure the main shell body portion 222 to the sub-frame 240.

The upper side wall portion 228 of the shell central body portion 222 has a circular opening 298 formed therethrough. A rounded knob 300 which provides the actuator 206 connects to the knob-driven gear 282 through this opening such that manual rotation of the knob 300 rotates the knob-driven gear 282. A crank may be used in place of the knob. Alternatively, an AC or battery operated motor driven system or any other suitable arrangement may be used as the actuator 206.

The removable cartridge 204 used in this embodiment of the invention includes a cartridge body structure 304, a first feed roll 306, a second feed roll 308, and a take-up roll 310. The cartridge body 304 includes a pair of injection molded side walls 312, 314, an injection molded transverse nip roller bearing structure 316 with a generally triangular cross-sectional shape, an injection molded substrate supporting wall 318, an injection molded feed side protective wall 320, and an injection molded discharge side protective wall 322. Each side wall 312, 314 has a pair of hubs 324, 326, a pair of tab receiving openings 328 for mounting tabs 329 on the substrate supporting wall 318, a pair of tab receiving openings 330 for mounting tabs 331 on the discharge side protective wall 320, and an opening 332 for mounting the ends of the discharge side protective wall 322. Each side wall 312, 314 also has an opening 334 for receiving the take-up roll 310 and side wall 314 has a hub 336 for mounting the take-up roll driving gear 338 that drives the take-up roll 310.

The first feed roll 306 has an axle 340, a core 342, and a wound supply of adhesive mask substrate 344 with a bonding side as discussed previously. The axle 340 is mounted in hubs 324 and the core 342 is rotatably mounted on the axle 340 to enable unwinding of the substrate 344. The second feed roll 308 has an axle 346, a core 348, and a wound supply of adhesive transfer substrate 350 with adhesive coated on an adhesive carrying surface thereof as discussed previously. The axle 346 is mounted in hubs 326 and the core 348 is rotatably mounted to the axle 346 to enable unwinding of the adhesive transfer substrate 350.

Figure 17:
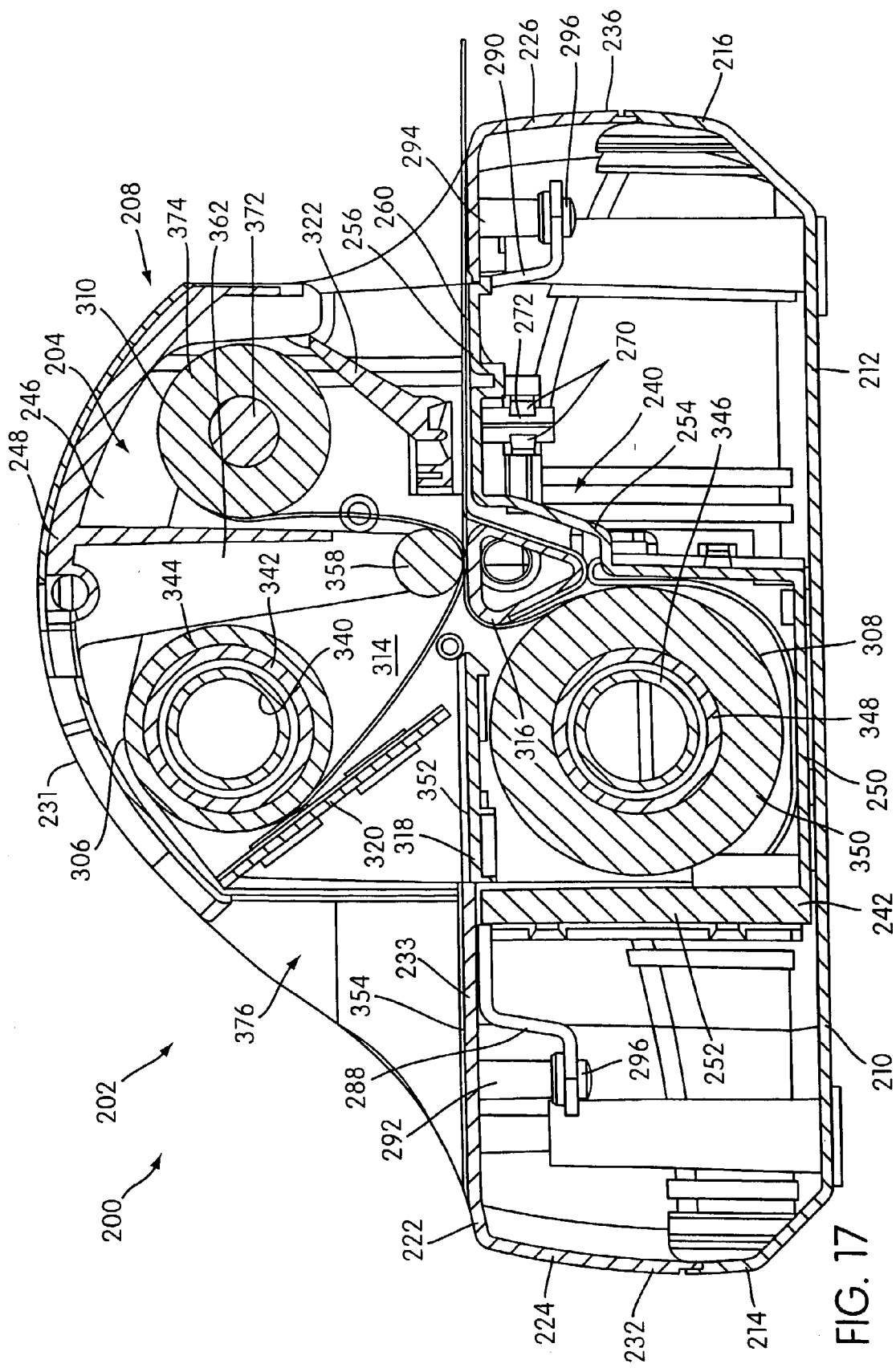
FIG. 17 is a cross-sectional view taken along line 17—17 of FIG. 16.

As can be best appreciated from the cross-sectional view of FIG. 17, the cartridge 204 is removably mounted within the frame 202. Specifically, the cartridge 204 is removably mounted such that the adhesive transfer take-up roll 308 is received between the front and rear walls 252, 254 of the sub-frame main body portion 242 and the upper substrating supporting surface 352 substrate supporting wall 318 of the cartridge 204 is aligned with the upper substrate supporting surface 354 of substrating supporting wall 233.

Figure 18:
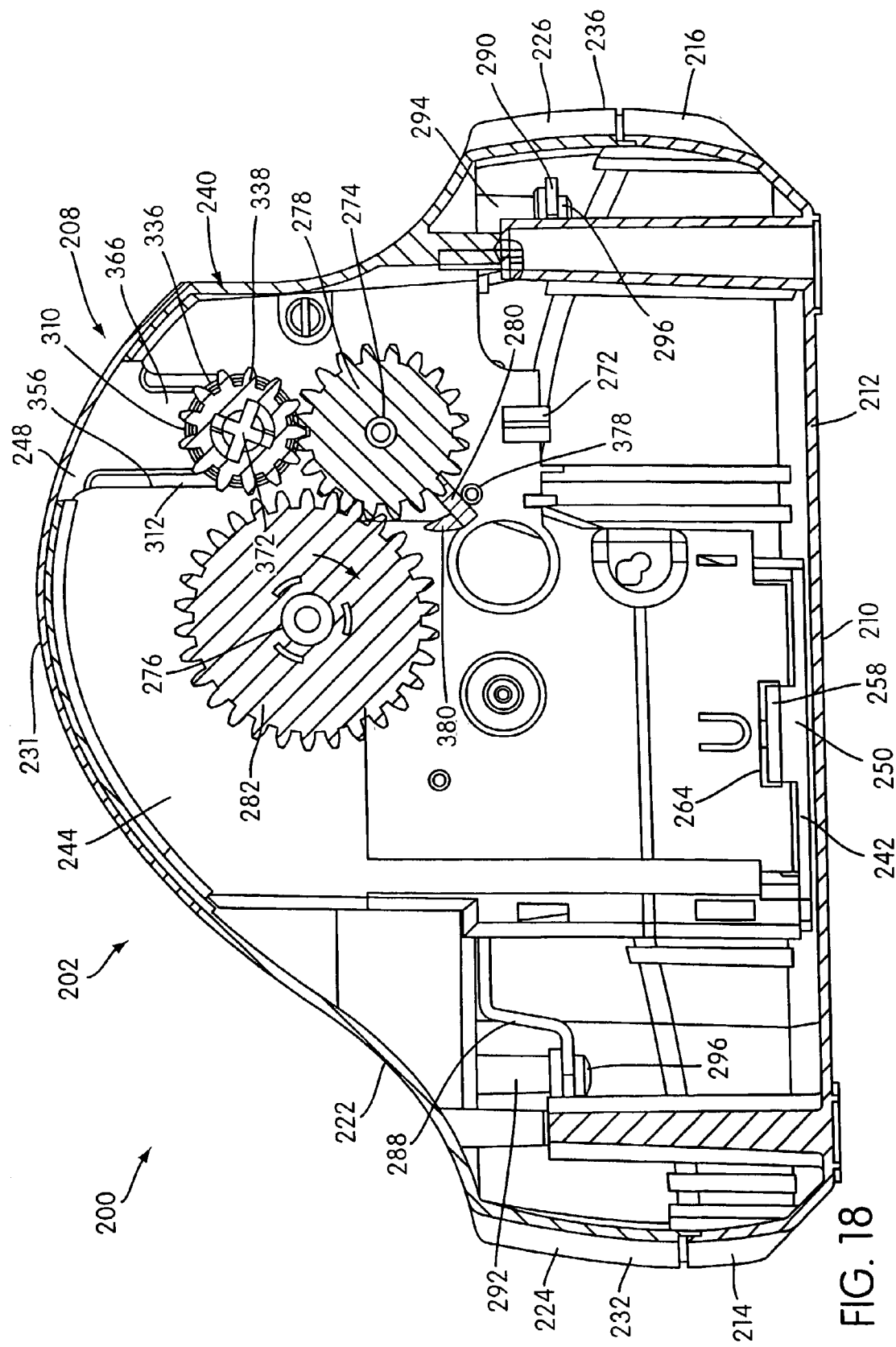
FIG. 18 is a cross-sectional view taken along line 18—18 of FIG. 16.

The hub 336 slides inside an upwardly facing generally U-shaped recess 356 on wall 244 to the position as shown in FIG. 18. The mask substrate 344 extends between the take-up roll 310 and the supply roll 306. Specifically, the mask substrate 344 is connected to the take-up roll 310 such that rotation of the take-up roll 310 in a clockwise direction (as viewed in FIGS. 17 and 18) winds up the masks substrate 344 thereon.

While the cover member 231 and the sub-frame cover portion 248 are still removed, a nip roller 358 is placed within the frame 202 and inside the cartridge 204 so that it rests on top of the nip roller bearing structure 316 with the mask and transfer substrates 344, 350 sandwiched therebetween. The nip roller 358 has an axle 360 protruding from each end thereof. The sub-frame cover portion 248 has a pair of elongated legs 362 depending downwardly therefrom. Each of these legs 362 provides an arcuate axle engaging surface 364 at the lower end thereof. The cover member 231 then mounts atop the central body portion 222 in snap-fit relation to press the sub-frame cover portion 248 downwardly with the axle engaging surfaces 364 engaging the respective axles 360 to force the nip roller 358 in pressure applying relation against the nip roller bearing structure 316 with the mask and adhesive transfer substrates therebetween.

The sub-frame cover portion 248 also has a tab 366 that depends downwardly therefrom on one side thereof. This tab 366 has an arcuate surface 368 at the lower edge thereof. The tab surface 368 engages a hub 370 provided on the gear carrying end of the take-up roll's axle 372. By way of the downward pressure from the snap-fit relation of the cover member 231, the tab 366 helps ensure that the gear 338 on the end of the take-up roll 310 is maintained in proper intermeshed with the roller gear 278.

The take-up roll 310 has a rubber sleeve 374 that slides over the axle 372. As mentioned before, the lead and portion of the mask substrate 344 is attached to this core 372 so that rotating the take-up roll 310 in the wind-up direction winds up the mask substrate 344 from the pressure applying assembly.

To remove the cartridge 204 for replacement thereof, the user removes the cover member 231 and the sub-frame cover portion 248. Then, the user lifts the cartridge 204 upwardly out of the frame 202 and replaces it with a new cartridge.

The frame 202 in this embodiment may be of any configuration and is not limited to the outer shell sub-frame arrangement illustrated. The use of the outer shell/sub-frame arrangement is advantageous from a manufacturing viewpoint in situations where the manufacturer desires to produce a variety of apparatuses with different external configurations. In that situation, the manufacturer can use the same sub-frame for each of the varying apparatuses in combination with different outer shells. Thus, the manufacturer can use common internal parts to produce apparatuses with different external configurations. However, the invention is not intended to be limited to such an arrangement.

To use the apparatus 200 of this second embodiment, the user places a selected substrate on the feed-side substrate supporting surfaces 352 and 354 and advances the selected substrate in between the nip roller 358 and the nip roller bearing structure 316 of the pressure applying assembly, so that the leading edge of the substrate contacts the adhesive on the adhesive transfer substrate 350. Then, the user rotates the knob 300 in a clockwise direction (as viewed in FIG. 18)

to effect clockwise rotation of the knob-driven gear 282. This in turn rotates the idler gear 278 in a counter-clockwise direction via its intermeshed relation with the knob-driven gear 282. In turn, such counter-clockwise rotation of the idler gear 274 rotates the take-up roll gear 338 and hence the take-up roll 310 in a clockwise direction via their intermeshed relation.

This clockwise rotation of the take-up roll 310 causes the mask substrate 344 to wind up on the take-up roll 310, thus unwinding it from its supply roll 306 and pulling it through the pressure applying assembly. Because of the downward pressure applied by the nip roller 358, the adhesive on the adhesive transfer substrate 346 adheres to the bonding side of the mask substrate 344 and to the inserted leading edge of the selected substrate. This adherence causes the selected substrate and the adhesive transfer substrate 346 to be pulled through the pressure applying assembly along with the mask substrate 344 as the knob 300 continues to be rotated.

As the substrates advance together through the pressure applying assembly, the nip roller 358 and the nip roller bearing structure 316 cooperate to apply pressure to the substrates so that the adhesive on the transfer substrate 376 adheres to the selected substrate and the portions of the mask substrate 344 exposed around the periphery of the selected substrate. The mask substrate 344 with the excess adhesive thereon is wound up on the take-up roll 310 and the transfer substrate 346 with the selected substrate adhesed thereto are discharged from the pressure applying assembly onto the substrate supporting surface 260. The user can then cut off the discharged portion of the transfer substrate 346 either with scissors or by running a blade along lateral groove 262 through the substrate 346. Then, the selected substrate can be peeled off the transfer substrate 346 and adhered to a contact surface as desired.

The anti-reversing member 280 comes into play when the user attempts to rotate the knob 300 in a reverse direction, which in counter-clockwise in the illustrated embodiment. During rotation of the idler gear 278, friction is created between the idler gear 278 and the anti-reversing member 280 such that the anti-reversing member 280 tends to rotate in the same direction as the idler gear 278. During normal operation of the apparatus (clockwise rotation of the knob 300) the anti-reversing member 280 is held against a post 378 in a disengaged position with the idler gear rotating relative thereto in its proper counter-clockwise direction. In this disengaged position, the wedging tooth 380 on the anti-reversing member 280 is maintained out of engagement with the teeth of the idler gear 278 and the knob-driven gear 280. However, rotation of the knob 230 in the opposite or reverse direction cause the idler gear 278 to rotate in an improper clockwise direction. This causes the idler gear 278 to rotate the anti-reversing member 280 by the friction therebetween in a clockwise direction until the wedging tooth 380 is wedged in between the teeth of knob-driven gear 282 and the idler gear 278. As a result of this wedging, further rotation of the gears in this improper direction is prevented and thus rotation of the take-up roll 310 in an unwinding direction is minimized. This prevents unwanted unwinding of the mask substrate 344 on the take-up roll.

Preferably, the apparatus is of a desktop size with an external configuration that allows it to be manually handled and carried by a single person. However, the principles of the present invention are not limited by size and the apparatus of a large size for industrial heavy use applications.

Figure 16:
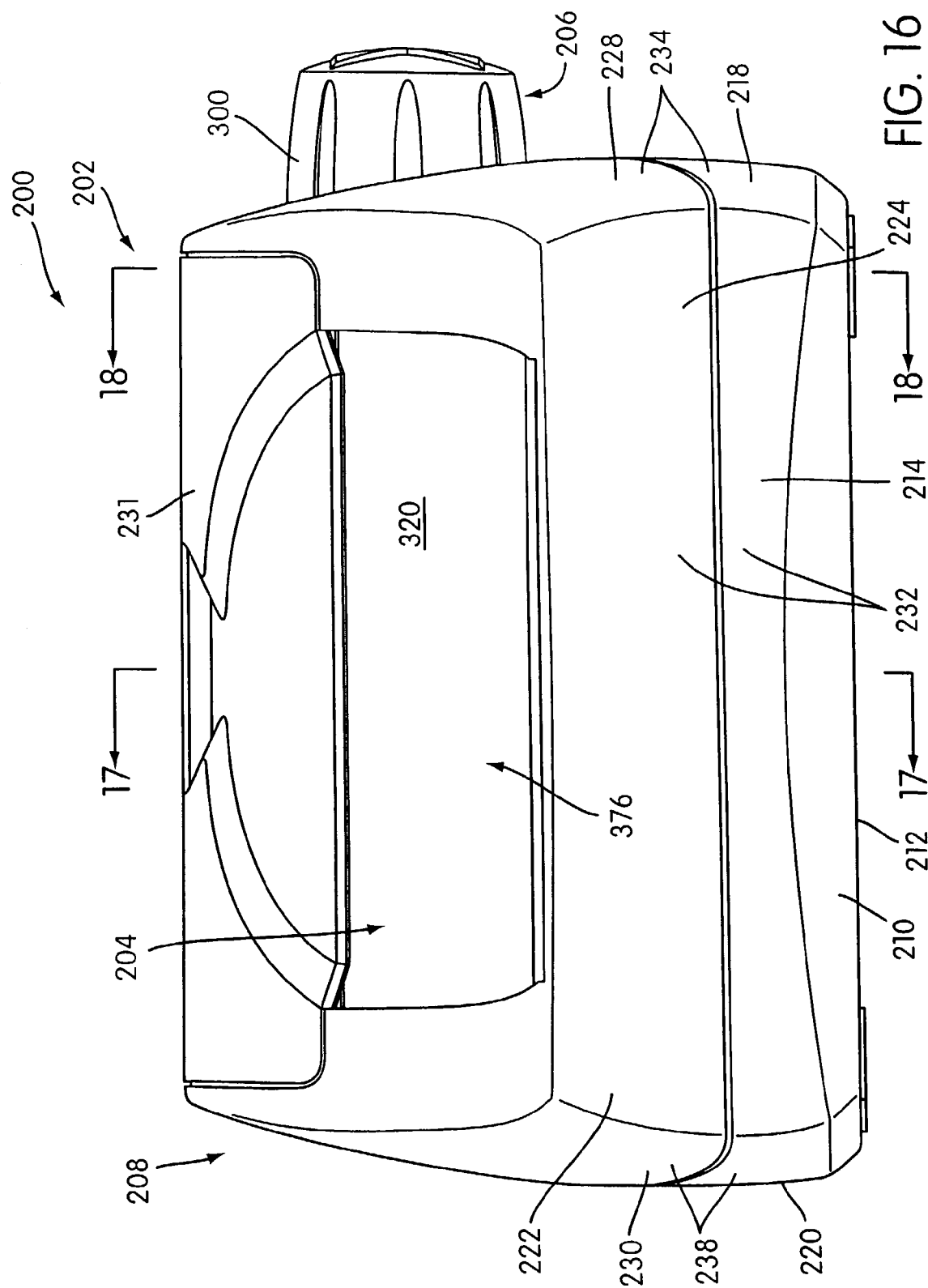
FIG. 16 is a front elevational view of the apparatus of FIG. 14.

It should be noted from FIGS. 14 and 16 that the lateral width of the opening 376 through which the selected substrate is fed is slightly narrower than the width of the mask and transfer substrates 344, 346. This ensures that the adhesive on the transfer substrate 346 can adhere to at least the edges of the mask substrate of 344 during operation to effect efficient advancement of all the substrates. If a selected substrate of greater width than the mask and transfer substrates 344, 346 were allowed to be fed into the apparatus, then the situation may occur where no bonding takes place between the transfer and mask substrate 344, 346 and turning of the knob 300 may cause the mask substrate 344 to simply slip over the top of the selected substrate without pulling the transfer substrate 346 and selected substrate through the pressure applying assembly. However, this feature is preferred and not necessary and should not be considered to limit the invention.

In the broader aspects of the invention, the apparatus may be of the type that does not have an actuator. In this type of apparatus, the user pulls on the free end of the transfer substrate to advance the selected substrate, the mask substrate and the transfer substrate together through the pressure applying assembly. In that arrangement, a nip roller in the pressure applying assembly would be geared or otherwise connected by a belt or the like to the take-up roll. Advancement of the substrates would rotate the nip roller, which in turn rotated the take-up roll to wind up the mask substrate. An example of such a construction is disclosed in U.S. patent application of Velasquez et al, Ser. No. 60/160,631, the entirety of which is incorporated into the present application in its entirety for all purposes.

It can thus be appreciated that the objects of the present invention have been fully and effectively accomplished. It is to be understood that the foregoing specific embodiment has been provided to illustrate the structural and functional principles of the present invention and is subject to change without departure from such principles. Therefore, the present invention is intended to encompass all changes, alterations, and substitutions within the spirit and scope of the appended claims.

What is claimed:

1. A master processing apparatus comprising:
    a frame having an upwardly facing opening;
    a first feed roll rotatably mounted within the frame and carrying a supply of a first supply substrate;
    a second feed roll rotatably mounted within the frame and carrying a supply of a second supply substrate;
    a layer of pressure-sensitive adhesive disposed on at least one of the supply substrates;
    the first and second feed rolls being removable through the upwardly facing opening of the frame to enable replacement thereof through the upwardly facing opening;
    an upper cooperating pressure applying structure and a lower cooperating pressure applying structure, the cooperating pressure applying structures being positioned adjacent one another for receiving the first and second supply substrates therebetween and having surfaces engageable with the supply substrates to apply pressure thereto; and
    a cover mounted in a closed position to the frame to cover the upwardly facing opening, the cover cooperating with the frame in the closed position to urge the upper cooperating structure downwardly against the lower cooperating structure so as to apply the pressure to the supply substrates;
    the cover being movable to an open position to uncover the upwardly facing opening to provide for separation of the upper cooperating structure from the lower cooperating structure, and to enable the first and second feed rolls to be removed and replaced through the upwardly facing opening of the frame.

2. A master processing apparatus according to claim 1, wherein the cover cooperates with the frame by a snap-fit relation.

3. A master processing apparatus according to claim 1, wherein the cover is removable from the frame.

4. A master processing apparatus according to claim 1, wherein the upper cooperating pressure applying structure and the cover are separable so that when the cover is moved to its open position the upper cooperating pressure applying structure remains removably seated atop the lower pressure applying structure.

5. A master processing apparatus according to claim 1, wherein one of the cooperating pressure applying structures is a nip roller.

6. A master processing apparatus according to claim 5, wherein the upper cooperating pressure applying structure is the nip roller.

7. A master processing apparatus according to claim 6, wherein the lower cooperating pressure applying structure is a fixed nip roller bearing structure.

8. A master processing assembly according to claim 1, further comprising a cartridge body structure and wherein the first and second feed rolls are rotatably mounted to the cartridge body structure for removal and replacement together.

9. A master processing assembly according to claim 8, wherein the lower cooperating pressure applying structure is provided by the cartridge body structure.

10. A master processing apparatus according to claim 9, wherein one of the cooperating pressure applying structures is a nip roller.

11. A master processing apparatus according to claim 10, wherein the upper cooperating pressure applying structure is the nip roller.

12. A master processing apparatus according to claim 11, wherein the lower cooperating pressure applying structure is a fixed nip roller bearing structure.

13. A master processing apparatus according to claim 1, further comprising a take-up roll rotatably mounted in the frame and having the first supply substrate connected thereto such that rotation of the take-up roll winds the first supply substrate thereon.

14. A master processing apparatus according to claim 13, further comprising an actuator and a plurality of gears including a gear on the take-up roll and a gear on the actuator, the plurality of gears being intermeshed such that operation of the actuator to rotate the gear thereon is transmitted to affect rotation of the take-up roll.

15. A master processing assembly according to claim 14, wherein the cover cooperates with the frame in the closed position to maintain the gear on the take-up roll intermeshed in the plurality of gears.

16. A master processing assembly according to claim 15, further comprising a cartridge body structure and wherein the first and second feed rolls and the take-up roll are rotatably mounted to the cartridge body structure for removal and replacement together.

17. A master processing assembly according to claim 16, wherein the lower cooperating pressure applying structure is provided by the cartridge body structure.

18. A master processing apparatus according to claim 17, wherein one of the cooperating pressure applying structures is a nip roller.

19. A master processing apparatus according to claim 18, wherein the upper cooperating pressure applying structure is the nip roller.

20. A master processing apparatus according to claim 19, wherein the lower cooperating pressure applying structure is a fixed nip roller bearing structure.

21. A removable cartridge configured to be used with a master processing apparatus for processing a selected substrate, the apparatus comprising a frame and an actuator, the cartridge comprising:

a cartridge body structure constructed and arranged to be removably mounted to the apparatus frame;

a first feed roll rotatably mounted to the body structure and carrying a supply of a first supply substrate, a second feed roll rotatably mounted to the body structure and carrying a supply of a second supply substrate, a layer of pressure-sensitive adhesive disposed on at least one of the first and second supply substrates, a pressure applying assembly having a pair of pressure applying cooperating structures mounted to the cartridge body structure, the pressure applying cooperating structures being constructed and arranged to apply pressure to substrates fed therebetween, the first and second supply substrates being disposed between the cooperating structures with the layer of adhesive disposed between the substrates;

the first feed roll, the second feed roll, and the pressure applying assembly being constructed and arranged such that, when the cartridge body structure is removably mounted to the frame, the selected substrate can be inserted between the cooperating structures of the pressure applying assembly and between the portions of the first and second supply substrates disposed between the cooperating structures;

the pressure applying assembly being constructed and arranged to be operatively connected to the actuator when the cartridge body structure is removably mounted to the frame such that, after the selected substrate has been inserted between the cooperating structures of the pressure applying assembly and between the portions of first and second supply substrates, operation of the actuator will affect cooperating structure movement so as to (a) perform master processing operation wherein the selected substrate, the first supply substrate, and the second supply substrate are fed through the pressure applying assembly to affect adhesive bonding between the selected substrate and the supply substrates and (b) discharge the processed substrates outwardly from the pressure applying assembly.

22. A removable cartridge according to claim 21, wherein the first supply substrate is an adhesive transfer substrate, the adhesive transfer substrate having the layer of pressure-sensitive adhesive disposed on an adhesive carrying side thereof and wherein the second supply substrate is an adhesive mask substrate having a bonding side to which the adhesive will bond, the pressure applying assembly being constructed and arranged such that, when the selected substrate is inserted between the adhesive transfer substrate and the adhesive mask substrate, the master processing operation can be performed as an adhesive transfer operation wherein the pressure applying assembly applies pressure to the transfer substrate and the mask substrate with the selected substrate inserted therebetween to cause the adhesive on the adhesive carrying side of the adhesive transfer substrate to adhesively bond to one side of the selected substrate and to any portions of the bonding side of the mask substrate which extend adjacent the periphery of the selected substrate and are engaged directly with the adhesive layer, thereby enabling the mask substrate to be moved away from the selected substrate and the transfer substrate along with any portions of the adhesive layer bonded to the bonding side remaining bonded thereto and being substantially removed from the adhesive carrying side of the transfer substrate.

23. A removable cartridge according to claim 22, further comprising a take-up roll mounted to the cartridge body structure;

the adhesive mask substrate having a lead end portion connected to the take-up roll such that rotation of the take-up roll winds up a discharged portion of the mask substrate to which the pressure has been applied along with any portions of the adhesive layer bonded to the bonding side of the discharged portion remaining bonded thereto and being substantially removed from the adhesive carrying side of the transfer substrate;

the take-up roll being constructed and arranged to be operatively connected to the actuator when the cartridge is removably mounted to the frame such that, as the processed substrates are being discharged outwardly from the discharge side of the pressure applying assembly, operation of the actuator will rotate the take-up roll as aforesaid.

24. A removable cartridge according to claim 23, further comprising a take-up roll gear provided on the take-up roll, the gear being configured to intermesh with a gear on the frame which is driven by the actuator so as to operatively connect the actuator to the take-up roll.

25. A removable cartridge according to claim 24, further comprising a pressure applying assembly gear provided on the pressure applying assembly, the pressure applying assembly gear being constructed and arranged to intermesh with another gear on the frame which is also driven by the actuator so as to operatively connect the actuator to the pressure applying assembly.

26. A removable cartridge according to claim 25, wherein at least one of the cooperating pressure applying structures is a rotatable nip roller and wherein the pressure applying assembly gear is connected to the nip roller.

27. A removable cartridge according to claim 22, wherein at least one of the cooperating pressure applying structures is a rotatable nip roller and further comprising a nip roller gear connected to the nip roller, the nip roller gear being configured to intermesh with a gear on the frame which is driven by the actuator so as to operatively connect the actuator to the nip roller so that operation of the actuator rotates the nip roller to provide the cooperating structure movement.

28. A master processing apparatus comprising:

a frame;

a removable cartridge including a cartridge body structure constructed and arranged to be removably mounted to said frame;

a first feed roll carrying a supply of an adhesive carrying substrate, said adhesive carrying substrate having a layer of pressure-sensitive adhesive disposed on an adhesive carrying side thereof;

a second feed roll carrying a supply of an adhesive mask substrate, said adhesive mask substrate having a bonding side to which said adhesive will bond;

a take-up roll, said adhesive mask substrate having a lead end portion thereof connected to said take-up roll;

said first feed roll, said second feed roll, and said take-up roll each being rotatably mounted to said cartridge body structure such that removably mounting said cartridge body structure to said frame removably mounts said first feed roll, said second feed roll, and said take-up roll to said frame, said first and second feed rolls being positioned such that a selected substrate can be inserted between the adhesive carrying substrate and the mask substrate;

a pressure applying assembly constructed and arranged to apply pressure to said adhesive carrying substrate and said mask substrate with said selected substrate inserted therebetween;

said apparatus being constructed and arranged such that, when the selected substrate is inserted between said adhesive carrying substrate and said adhesive mask substrate, a master processing operation can be performed wherein (a) said adhesive carrying substrate, said mask substrate, and the selected substrate are moved together in a feeding direction, (b) said pressure applying assembly applies pressure to said adhesive carrying substrate and said mask substrate with said selected substrate inserted therebetween to cause the adhesive on the adhesive carrying side of said adhesive carrying substrate to adhesively bond to one side of the selected substrate and to any portions of the bonding side of said mask substrate which extend adjacent the periphery of the selected substrate and are engaged directly with said adhesive layer, and (c) said take-up roll rotates to wind up a discharged portion of said mask substrate to which said pressure has been applied along with any portions of said adhesive layer bonded to the bonding side of the discharged portion remaining bonded thereto and being substantially removed from the adhesive carrying side of said adhesive carrying substrate.

29. A master processing apparatus according to claim 28, wherein said pressure-applying assembly comprises a pair of cooperating pressure applying structures constructed and arranged to engage and apply pressure to substrates fed therebetween, said mask substrate and said carrying substrate each extending between said cooperating pressure applying structures such that the selected substrate can be inserted between said pressure applying structures and said mask and carrying substrates so that said pressure applying structures apply pressure to said mask substrate, said carrying substrate, and said selected substrate during the master processing operation to affect said adhesive bonding.

30. A master processing apparatus according to claim 29, further comprising an actuator operatively connected to said take-up roll such that operation of said actuator rotates said take-up roll to wind up said mask substrate.

31. A master processing apparatus according to claim 30, wherein said actuator is manually powered.

32. A master processing apparatus according to claim 31, wherein said actuator is a manually turnable knob.

33. A master processing apparatus according to claim 31, wherein said actuator is a manually operable crank handle.

34. A master processing apparatus according to claim 30, wherein said actuator is operatively connected to said take-up roll by a plurality of intermeshed toothed gears.

35. A master processing apparatus according to claim 30, wherein said actuator is operatively connected to said take-up roll by an endless flexible driving element.

36. A master processing apparatus according to claim 29, wherein one of said cooperating pressure applying structures is a rotatable nip roller and the other of said cooperating pressure applying structures is a fixed nip roller bearing structure against which said rotatable nip roller bears.

37. A master processing apparatus according to claim 36, further comprising an actuator operatively connected to said take-up roll such that operation of said actuator rotates said take-up roll to wind up said mask substrate.

38. A master processing apparatus according to claim 37, wherein said actuator is also operatively connected to said rotatable nip roller such that operation of said actuator rotates said rotatable nip roller.

39. A master processing apparatus according to claim 37, wherein said rotatable nip roller is freely rotatable and is not operatively connected to said actuator.

40. A master processing apparatus according to claim 29, wherein said frame provides a discharge-side substrate supporting surface for supporting the adhesive carrying substrate and the selected substrate as they are discharged from said pressure applying assembly.

41. A master processing apparatus according to claim 29, wherein said frame provides a feed-side substrate supporting surface for supporting the selected substrate as it is being fed into said pressure applying assembly.

42. A master processing apparatus according to claim 29, wherein said pressure-applying assembly is mounted on said cartridge body structure such that removably mounting said cartridge body structure to said frame removably mounts said pressure applying assembly to said frame.

43. A master processing apparatus according to claim 29, wherein said pressure-sensitive adhesive comprises permanent or repositionable pressure-sensitive adhesive.

44. A master processing apparatus according to claim 29, wherein said first feed roll includes a core about which said carrying substrate is wound and wherein said second feed roll includes a core about which said mask substrate is wound.

45. A master processing apparatus according to claim 42, wherein one of said cooperating pressure applying structures is mounted directly to said cartridge body structure and wherein the other of said cooperating pressure applying structures is mounted directly to said frame, said adhesive mask substrate extending from said first feed roll to said take-up roll across said cooperating pressure applying structure mounted to said cartridge body structure such that removably mounting said cartridge body structure to said frame positions said cooperating pressure applying structures adjacent one another with the mask substrate disposed therebetween.

46. A master processing apparatus according to claim 45, wherein the cooperating pressure applying structure mounted directly to said cartridge body structure is a rotatable nip roller and wherein the cooperating pressure applying structure mounted directly to said frame is a fixed nip roller bearing structure.

47. A master processing apparatus according to claim 29, further comprising a one-way clutch mechanism operatively connected between said actuator and said take-up roll, said one-way clutch mechanism being constructed and arranged such that operation of said actuator in a normal direction is transmitted through said one-way clutch mechanism to rotate said take-up roll in a winding direction to wind-up the discharged mask substrate and such that if a user attempts to operate said actuator in a reverse direction opposite said normal direction said one-way clutch limits rotation of said take-up roll opposite said winding direction so as to limit unwinding of said mask substrate.

48. A master processing apparatus according to claim 47, wherein said one-way clutch mechanism comprises a plurality of gears which operatively connect said actuator to said take-up roll, and an anti-reverse member having a wedging tooth, said anti-reverse member being movable in response to said actuator being operated in said reverse direction from a normal disengaged position wherein said wedging tooth is disengaged from the teeth of an adjacent pair of said gears to an engaged position wherein said wedging tooth is engaged and wedged between the teeth of an adjacent pair of said gears so as to prevent further rotation of said gears due to operation of said actuator in said reversing direction, said anti-reverse member being movable in response to said actuator being moved in said normal direction back from said engaged position thereof to said disengaged position thereof.

49. A master processing apparatus according to claim 48, wherein said anti-reverse member is frictionally engaged with one of said gears to effect the movement thereof between said engaged and disengaged positions.

50. A master processing apparatus according to claim 47, wherein said one-way clutch mechanism is provided by a pair of interengaged one-way slip clutch gears that are constructed and arranged such that operation of said actuator in said normal direction is transmitted through said one-way clutch mechanism to rotate said take-up roll in said winding direction and such that said slip clutch gears slip relative to one another during operation of said actuator in said second direction so that rotation is not transmitted to said take-up roll via said slip clutch gears.

51. A master processing apparatus according to claim 28, further comprising structure defining a feed opening at a feed side of said frame, said feed opening having a lateral width less that than that of lateral widths of both said adhesive carrying substrate and said adhesive mask substrate so as to discourage feeding of selected substrates having lateral widths greater than said carrying and mask substrates.

52. A removable cartridge configured to be used with a master processing apparatus for processing a selected substrate, the apparatus comprising a frame, said cartridge comprising:

a cartridge body structure constructed and arranged to be removably mounted to the apparatus frame;

a first feed roll rotatably mounted to said body structure and carrying a supply of an adhesive carrying substrate, said adhesive carrying substrate having a layer of pressure-sensitive adhesive disposed on an adhesive carrying side thereof;

a second feed roll rotatably mounted to said body structure and carrying a supply of an adhesive mask substrate, said adhesive mask substrate having a bonding side to which said adhesive will bond;

a take-up roll rotatably mounted to said body structure, said adhesive mask substrate having a lead end portion thereof connected to said take-up roll;

said cartridge being constructed and arranged such that, when said cartridge body structure is removably mounted to the frame, master processing operation can be performed wherein (a) said adhesive carrying substrate, said adhesive mask substrate, and the selected substrate are advanced together in a feeding direction through a pressure applying assembly to affect adhesive bonding between said selected substrate and said supply substrates and (b) said pressure applying assembly applies pressure to said carrying substrate and said mask substrate with said selected substrate inserted therebetween to cause the adhesive on the adhesive carrying side of said adhesive carrying substrate to adhesively bond to one side of the selected substrate and to any portions of the bonding side of said mask substrate which extend adjacent the periphery of the selected substrate and are engaged directly with said adhesive layer, and (c) said take-up roll rotates to wind up a discharged portion of said mask substrate to which said pressure has been applied along with any portions of said adhesive layer bonded to the bonding side of the discharged portion remaining bonded thereto and being substantially removed from the adhesive carrying side of said carrying substrate.

53. A removable cartridge according to claim 52, wherein said pressure-applying assembly comprises a pair of cooperating pressure applying structures constructed and arranged to engage and apply pressure to substrates fed therebetween, said mask substrate and said carrying substrate each extending between said cooperating pressure applying structures such that the selected substrate can be inserted between said pressure applying structures and said mask and carrying substrates so that said pressure applying structures apply pressure to said mask substrates, said carrying substrate, and said selected substrate during the master processing operation to affect said adhesive bonding.

54. A removable cartridge according to claim 52, wherein said pressure-applying assembly is mounted on said cartridge body structure such that removably mounting said cartridge body structure to said frame removably mounts said pressure applying assembly to said frame.

55. A removable cartridge according to claim 52, wherein said pressure-applying assembly is mounted on said frame.

* * * * *